(12) United States Patent
Zheng

(10) Patent No.: US 9,628,213 B2
(45) Date of Patent: *Apr. 18, 2017

(54) ACCESS SYSTEM, COMMUNICATION METHOD AND DEVICE FOR OPTICAL FIBER NETWORK

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,832

(22) Filed: Jul. 18, 2016

(65) Prior Publication Data
US 2016/0329980 A1 Nov. 10, 2016

Related U.S. Application Data

(63) Continuation of application No. 14/322,574, filed on Jul. 2, 2014, now Pat. No. 9,413,480, which is a continuation of application No. PCT/CN2012/079767, filed on Aug. 7, 2012.

(51) Int. Cl.
*H04J 14/00* (2006.01)
*H04J 3/16* (2006.01)
*H04B 10/27* (2013.01)
*H04L 12/28* (2006.01)

(52) U.S. Cl.
CPC ............ *H04J 3/1652* (2013.01); *H04B 10/27* (2013.01); *H04L 12/2885* (2013.01)

(58) Field of Classification Search
CPC . H04B 10/27; H04B 10/2503; H04L 12/2885; H04L 12/2861; H04Q 11/0067; H04Q 11/0071; H04Q 2011/0079; H04Q 2011/0084; H04Q 2213/1301; H04J 3/1652
USPC .......................... 398/66–72, 75, 98, 99, 100
See application file for complete search history.

(56) References Cited

U.S. PATENT DOCUMENTS

| 6,430,193 | B1 * | 8/2002 | Raissinia | H04W 28/065 370/448 |
| 6,771,614 | B1 * | 8/2004 | Jones, IV | H04B 7/2612 370/310 |
| 7,327,753 | B2 * | 2/2008 | Raissinia | H04W 28/065 370/208 |
| 7,330,654 | B2 * | 2/2008 | Song | H04L 12/4625 370/395.3 |
| 7,672,591 | B2 * | 3/2010 | Soto | H04B 10/808 398/66 |
| 8,050,561 | B2 * | 11/2011 | Effenberger | H04J 14/0226 370/252 |

(Continued)

*Primary Examiner* — Hibret Woldekidan
(74) *Attorney, Agent, or Firm* — Slater Matsil, LLP

(57) ABSTRACT

Embodiments of the present invention provide an access system and a communication method for an optical fiber network. A virtual ONU located on a user side is established, and an ONU control plane function, a PON MAC function, and a QoS function on an existing ONU is moved downwards to a virtual ONU. After the forgoing function modules are removed from the existing ONU, the existing ONU becomes an ONU physical converter and only has a function of converting the PON physical layer frame and the first user side physical layer frame.

12 Claims, 18 Drawing Sheets

(56) References Cited

U.S. PATENT DOCUMENTS

| | | | | |
|---|---|---|---|---|
| 8,073,330 B2* | 12/2011 | Zheng | H04L 12/2881 | 398/100 |
| 8,223,648 B2* | 7/2012 | Zheng | H04J 3/0697 | 370/236.2 |
| 8,416,816 B2* | 4/2013 | Bourgart | H04L 12/2872 | 370/524 |
| 8,422,881 B2* | 4/2013 | Yokotani | H04L 12/413 | 398/1 |
| 8,553,709 B2* | 10/2013 | Diab | H04L 12/2805 | 370/401 |
| 8,660,430 B2* | 2/2014 | Zheng | H04Q 11/0067 | 398/115 |
| 8,958,697 B2* | 2/2015 | Soto | H04B 10/2503 | 398/100 |
| 9,025,490 B2* | 5/2015 | Davari | H04L 41/5038 | 370/254 |
| 9,225,453 B2* | 12/2015 | Fang | H04J 14/005 | |
| 2003/0117998 A1* | 6/2003 | Sala | H04Q 11/0067 | 370/351 |
| 2005/0141623 A1* | 6/2005 | Cho | H04L 12/413 | 375/240.28 |
| 2009/0092388 A1* | 4/2009 | Yang | H04B 10/071 | 398/13 |
| 2009/0092394 A1* | 4/2009 | Wei | H04J 14/0282 | 398/79 |
| 2010/0208752 A1* | 8/2010 | Julien | H04L 12/6418 | 370/476 |
| 2010/0232794 A1* | 9/2010 | Zheng | H04J 3/1694 | 398/68 |
| 2011/0085795 A1* | 4/2011 | Ozaki | H04J 14/0282 | 398/25 |
| 2013/0236185 A1* | 9/2013 | Fang | H04L 65/1073 | 398/115 |
| 2014/0270773 A1* | 9/2014 | Elmoalem | G06F 8/65 | 398/66 |
| 2015/0263809 A1* | 9/2015 | Gupta | H04B 10/25 | 398/66 |

* cited by examiner

ACCESS SYSTEM, COMMUNICATION METHOD AND DEVICE FOR OPTICAL FIBER NETWORK

CROSS-REFERENCE TO RELATED APPLICATIONS

This application is a continuation of U.S. application Ser. No. 14/322,574, filed on Jul. 2, 2014, which is a continuation of International Application No. PCT/CN2012/079767, filed on Aug. 7, 2012, which is hereby incorporated by reference in its entirety.

TECHNICAL FIELD

The present invention relates to the field of communications and, in particular embodiments, to an access system, a communication method and a device for an optical fiber network.

BACKGROUND

Because an optical fiber has a higher transmission speed and users have increasingly high requirements on bandwidth, it has become a development trend for an access network to replace a cable with the optical fiber. FTTH (Fiber To The Home) is a future development direction. However, direct fiber to the home requires re-laying out an optical fiber for each home, which has high costs. Therefore, FTTDp (Fiber To Drop/Distribution Point) is still used for a long time. A copper cable (such as a phone twisted pair cable, a cable TV cable, a power cable, or an Ethernet network cable) that has been connected into the user's house or a wireless interface connection is still used in the last distance into the user's house for the connection of the optical fiber to an external wall of a family house An access system of an existing optical fiber network mainly includes an ONU (Optical Network Unit) and an OLT (Optical Line Termination), where the OLT is connected to the ONU through an optical fiber and is configured to send downstream data to the ONU or receive upstream data from the ONU. The ONU can complete a PON (Passive Optical Network) MAC (Media Access Control) function, an ONU control plane function, and a QoS (Quality of Service) function for the optical fiber network. The ONU can be connected to a CPE (Customer Premise Equipment) through the copper cable that has been connected into the user's house or through the wireless interface connection.

However, in the access system of the existing optical fiber network, the ONU is a device provided by a carrier. In a fiber to drop/distribution point scenario, the ONU needs to be deployed in a place near to a user side but far from a carrier's network (for example, deployed in the external wall of the family house). A large number of ONUs exist and the ONU needs to complete many functions such as the PON MAC function, the ONU control plane function and the QoS function. Therefore, in the case of massive ONUs on the optical fiber network, it is very difficult to maintain the ONUs on the optical fiber network and a maintenance cost is very high.

SUMMARY

To solve the problems of great difficulty and high cost in maintaining ONUs in an access system of an existing optical fiber network, embodiments of the present invention provide an access system, a communication method and a device for an optical fiber network. Technical solutions are as follows.

An access system for an optical fiber network is provided. An OLT is configured to assign an upstream time slice and a downstream time slice for each customer premises equipment connected to the optical fiber network. An ONU physical converter is connected to the OLT through an optical fiber and is configured to receive a PON physical layer frame which is sent by the OLT through a PON physical signal, to convert the PON physical layer frame to a first user side physical layer frame corresponding to a non-PON physical signal, to send the first user side physical layer frame to the customer premises equipment through the non-PON physical signal, to receive a first user side physical layer frame which is sent by the customer premises equipment through the non-PON physical signal, to convert the first user side physical layer frame to a PON physical layer frame corresponding to the PON physical signal, and to send the PON physical layer frame to the OLT through the PON physical signal. The customer premises equipment is connected to the ONU physical converter through a non-PON optical fiber and located on a user side and is configured to realize an ONU control plane function and a PON MAC function, and to send the first user side physical layer frame to the OLT according to the upstream time slice through the ONU physical converter or receive. According to the downstream time slice, the first user side physical layer frame which is sent by the OLT through the ONU physical converter.

The access system further includes a POS (Passive Optical Splitter), configured to receive the PON physical signal sent by the OLT, assign and send the PON physical signal to different ONU physical converters.

A communication method based on the forgoing system is provided. A customer premises equipment reports a data queue state to an OLT through an ONU physical converter. The OLT assigns an upstream time slice and a downstream time slice to the customer premises equipment and sends configuration information which includes the upstream time slice and the downstream time slice to the customer premises equipment through the ONU physical converter. The customer premises equipment sends upstream data to the OLT through the ONU physical converter or receives downstream data from the OLT according to the configuration information.

Before the customer premises equipment reports the data queue state to an OLT through an ONU physical converter, the method further includes the following steps. The customer premises equipment receives a second physical layer parameter which is delivered by the OLT through the ONU physical converter. The customer premises equipment establishes a new communication connection with the ONU physical converter according to the second physical layer parameter delivered by the OLT.

Before the customer premises equipment receives the second physical layer parameter which is delivered by the OLT through the ONU physical converter, the method further includes the following steps. The customer premises equipment establishes a communication connection with the ONU physical converter according to a default first physical layer parameter. The customer premises equipment establishes a communication connection with the OLT, where the default first physical layer parameter is reserved on the customer premises equipment and the ONU physical converter.

After the sending, by the customer premises equipment, according to the configuration information, upstream data to the OLT through the ONU physical converter or receiving downstream data from the OLT, the method further includes the following step. The customer premises equipment reports a physical line state of the communication connection with the OLT to the OLT through the ONU physical converter.

After the customer premises equipment sends the upstream data to the OLT through the ONU physical converter or receives downstream data from the OLT according to the configuration information, the method further includes the following steps. The OLT establishes a request to increase bandwidth for temporary communication of a user, reassigning bandwidth to the customer premises equipment, and delivers a third physical layer parameter to the customer premises equipment through the ONU physical converter according to current bandwidth assignment. The customer premises equipment establishes a new communication connection with the ONU physical converter according to the third physical layer parameter, and obtaining the reassigned bandwidth. The OLT restores bandwidth for the customer premises equipment when the temporary communication ends.

Further, the OLT restores the bandwidth for the customer premises equipment specifically by doing the following. The OLT delivers the second physical layer parameter to the customer premises equipment through the ONU physical converter. The customer premises equipment re-establishes a communication connection with the ONU physical converter according to the second physical layer parameter. The customer premises equipment re-establishes a communication connection with the ONU physical converter, so that the customer premises equipment restores the bandwidth before the temporary communication.

A customer premises equipment is provided, where the customer premises equipment is connected to an ONU physical converter through a non-PON optical fiber and is located on a user side, and is configured to realize an ONU control plane function and a PON MAC function, send, according to an upstream time slice assigned by an OLT, a first user side physical layer frame to the OLT through the ONU physical converter, or receive, according to a downstream time slice assigned by the OLT, a first user side physical layer frame which is sent by the OLT through the ONU physical converter.

Further, the customer premises equipment is further configured to receive a second physical layer parameter which is delivered by the OLT through the ONU physical converter and establish a new communication connection with the ONU physical converter according to the second physical layer parameter delivered by the OLT.

Further, the customer premises equipment is further configured to: before receiving the second physical layer parameter which is delivered by the OLT through the ONU physical converter, establish a communication connection with the ONU physical converter according to a default first physical layer parameter and establish a communication connection with the OLT, where the default first physical layer parameter is reserved on the customer premises equipment.

Further, the customer premises equipment is further configured to report a physical line state of the communication connection with the OLT to the OLT through the ONU physical converter.

Further, the customer premises equipment specifically includes the following. A user side interface unit is configured to receive an upstream second user side physical layer frame sent by a user or send a downstream second user side physical layer frame to the user. A virtual ONU processing unit is configured to realize the ONU control plane function, the PON MAC function, and a quality of service QoS function, encapsulate the upstream second user side physical layer frame into an upstream PON MAC layer frame, send the upstream PON MAC layer frame to the ONU physical converter through a user side physical layer processing unit according to the upstream time slice assigned by the OLT or receive, according to the downstream time slice assigned by the OLT, a downstream PON MAC layer frame sent by the user side physical layer processing unit, convert the downstream PON MAC layer frame to the downstream second user side physical layer frame, and send the downstream second user side physical layer frame to the user side physical layer processing unit through the user side interface unit.

The user side physical layer processing unit is configured to convert the upstream PON MAC layer frame sent by the virtual ONU processing unit to an upstream first user side physical layer frame corresponding to a non-PON physical signal and send the upstream first user side physical layer frame to the ONU physical converter through the non-PON physical signal, to receive a downstream first user side physical layer frame sent by the ONU physical converter, to convert the downstream first user side physical layer frame to the downstream PON MAC layer frame, and to send the downstream PON MAC layer frame to the virtual ONU processing unit.

Further, the customer premises equipment further includes a customer premises equipment CPE unit. The CPE unit is connected to the user side interface unit and a user equipment UE and is configured to receive the downstream second user side physical layer frame sent by the user side interface unit and forward the downstream second user side physical layer frame to the UE, or receive upstream data sent by the UE, convert the upstream data to the upstream second user side physical layer frame, and send the upstream second user side physical layer frame to the user side interface unit.

The customer premises equipment further includes the following. An external power supply unit is configured to provide power for the ONU physical converter. An ONU physical converter is connected to the OLT through an optical fiber, and configured to receive a PON physical layer frame which is sent by the OLT through a PON physical signal, convert the PON physical layer frame to a first user side physical layer frame corresponding to the non-PON physical signal, and send the first user side physical layer frame to the customer premises equipment through the non-PON physical signal; or receive a first user side physical layer frame which is sent by the customer premises equipment through the non-PON physical signal, convert the first user side physical layer frame to a PON physical layer frame corresponding to the PON physical signal, and send the PON physical layer frame to the OLT through the PON physical signal.

Further, the ONU physical converter is further configured to forward to the customer premises equipment the second physical layer parameter delivered by the OLT and establish the new communication connection with the customer premises equipment according to the second physical layer parameter delivered by the OLT.

Further, the ONU physical converter is configured to establish the communication connection with the customer premises equipment according to the default first physical layer parameter before the customer premises equipment receives the second physical layer parameter which is forwarded by the OLT through the ONU physical converter.

The default first physical layer parameter is reserved on the customer premises equipment.

Further, the ONU physical converter is configured to forward to the OLT the physical line state of the communication connection reported by the customer premises equipment.

Further, the ONU physical converter includes a non-PON physical layer processing unit, a switch control unit, a switch unit, and a PON physical layer processing unit. The non-PON physical layer processing unit is configured to receive the upstream first user side physical layer frame which is sent by the customer premises equipment through the non-PON physical signal and convert the upstream first user side physical layer frame to the upstream PON MAC layer frame. The switch control unit is configured to receive the upstream PON MAC layer frame when sent by the customer premises equipment, generate a switch control signal corresponding to the customer premises equipment and send the switch control signal corresponding to the customer premises equipment to the switch unit. The switch unit, including one output interface and at least one input interface where there is one-to-one correspondence between the input interface and the customer premises equipment connected to the ONU physical converter, is configured to connect, according to the switch control signal corresponding to the customer premises equipment, a channel between an input interface corresponding to the customer premises equipment and an output interface, where the channel is configured for the non-PON physical layer processing unit to send the upstream PON MAC layer frame obtained through conversion by the non-PON physical layer processing unit to the PON physical layer processing unit. The PON physical layer processing unit is configured to convert the upstream PON MAC layer frame to an upstream PON physical layer frame and send the upstream PON physical layer frame to the OLT through the PON physical signal.

Further, the ONU physical converter includes a non-PON physical layer processing unit, an Ethernet bridge, and a PON physical layer processing unit. The non-PON physical layer processing unit is configured to receive the upstream first user side physical layer frame which is sent by the customer premises equipment through the non-PON physical signal, convert the upstream first user side physical layer frame to the upstream PON MAC layer frame, and send the upstream PON MAC layer frame to the Ethernet bridge through an input interface corresponding to the non-PON physical layer processing unit. The Ethernet bridge, including one output interface and at least one input interface, is configured to receive the upstream PON MAC layer frame which is sent by the non-PON physical layer processing unit through the input interface and send the upstream PON MAC layer frame to the PON physical layer processing unit through the output interface. The PON physical layer processing unit is configured to receive the upstream PON MAC layer frame which is sent by the Ethernet bridge through the output interface, convert the upstream PON MAC layer frame to the upstream PON physical layer frame, and send the upstream PON physical layer frame to the OLT through the PON physical signal.

Further, the ONU physical converter includes a PON physical layer processing unit, a non-PON physical layer processing unit, and interfaces respectively corresponding to customer premises equipment connected to the ONU physical converter, and a downstream data replicating unit. The PON physical layer processing unit is configured to receive a downstream PON physical layer frame which is sent by the OLT through the PON physical signal and convert the downstream PON physical layer frame to a downstream PON MAC layer frame. The interfaces are configured respectively to connect lines between the downstream data replicating unit and the non-PON physical layer processing unit, where the lines are configured to send the downstream PON MAC layer frame obtained through conversion by the PON physical layer processing unit to the non-PON physical layer processing unit. The downstream data replicating unit is configured to replicate the downstream PON MAC layer frame obtained through conversion by the PON physical layer processing unit to all lines which belong to the ONU physical converter. The non-PON physical layer processing unit is configured to convert the downstream PON MAC layer frame to a downstream first user side physical layer frame and send the downstream first user side physical layer frame to the customer premises equipment through the non-PON physical signal.

Further, the ONU physical converter includes a PON physical layer processing unit, an Ethernet bridge, and a non-PON physical layer processing unit. The PON physical layer processing unit is configured to receive the downstream PON physical layer frame sent by the OLT, convert the downstream PON physical layer frame to the downstream PON MAC layer frame, add an Ethernet broadcast frame header to the downstream PON MAC layer frame to obtain an Ethernet frame, and send the Ethernet frame to the Ethernet bridge. The Ethernet bridge, including one input interface and at least one output interface, is configured to receive, through the input interface, the Ethernet frame sent by the non-PON physical layer processing unit and send the Ethernet frame to the PON physical layer processing unit through the output interface. The non-PON physical layer processing unit is specifically configured to receive the Ethernet frame which is sent by the Ethernet bridge through the output interface, remove the Ethernet broadcast frame header from the Ethernet frame to obtain the downstream PON MAC layer frame, convert the downstream PON MAC layer frame to the downstream first user side physical layer frame, and send the downstream first user side physical layer frame to the customer premises equipment through the non-PON physical signal.

The technical solutions provided in embodiments of the present invention have the following beneficial effects. The customer premises equipment is established, the ONU control plane function, the PON MAC function, and the QoS function on the existing ONU are moved downwards to the established customer premises equipment. After the forgoing functions are removed from the existing ONU, the existing ONU becomes the ONU physical converter and only has a function of converting the PON physical layer frame and the first user side physical layer frame. Therefore, a carrier does not need to maintain the ONU control plane function, the PON MAC function, and the QoS function, which lowers maintenance complexity and greatly reduces maintenance costs.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more clearly, the following further describes the embodiments of the present invention in detail with reference to the accompanying drawings.

Embodiment 1

Figure 1:
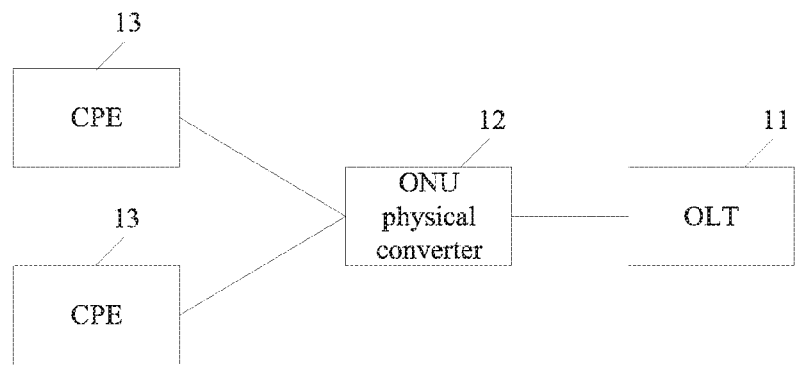
FIG. 1 is a schematic structural diagram of an access system for an optical fiber network provided by Embodiment 1 of the present invention.

As shown in FIG. 1, this embodiment provides an access system for an optical fiber network, where the system includes the following. An OLT11 is configured to assign an upstream time slice and a downstream time slice for each customer premises equipment connected to the optical fiber network.

An ONU physical converter 12 is connected to the OLT11 through an optical fiber, and configured to receive a PON physical layer frame which is sent by the OLT11 through a PON physical signal, convert the PON physical layer frame to a first user side physical layer frame corresponding to a non-PON physical signal, and send the first user side physical layer frame to a customer premises equipment 13 through the non-PON physical signal, or receive a first user side physical layer frame which is sent by the customer premises equipment 13 through the non-PON physical signal, convert the first user side physical layer frame to a PON physical layer frame corresponding to the PON physical signal, and send the PON physical layer frame to the OLT11 through the PON physical signal.

The customer premises equipment 13 is connected to the ONU physical converter 12 through a non-PON optical fiber and located on a user side, and configured to realize an ONU control plane function, a PON MAC function, and a quality of service QoS function and send an upstream first user side physical layer frame to the OLT11 according to the upstream time slice through the ONU physical converter 12 or receive, according to the downstream time slice, a downstream first user side physical layer frame which is sent by the OLT11 through the ONU physical converter 12.

It should be noted that in an optical fiber network system, the PON physical signal transmitted between the ONU physical converter and the OLT is specifically a PON optical signal, where the PON optical signal corresponds to a PON physical layer frame (PON PHY).

In this embodiment, a non-PON optical fiber connection may at least include a DSL (Digital Subscriber Line), a cable TV cable, an Ethernet network cable, a power cable, or a wireless interface, where the wireless interface may be a Wi-Fi (Wireless Fidelity) interface.

Accordingly, the non-PON physical signal specifically includes a DSL signal, a cable TV cable signal, an Ethernet signal, a power cable signal, or a wireless signal.

The first user side physical layer frame includes a physical layer frame corresponding to the DSL, the cable TV cable signal, the Ethernet signal, the power cable signal, or the wireless signal.

It should be noted that an existing optical fiber network includes: an EPON (Ethernet Passive Optical Network), a next generation EPON, a GPON (Gigabit Passive Optical Network), and a next generation GPON. In this embodiment, for ease of descriptions, the EPON is taken as an example to illustrate how this invention makes improvements.

Figure 2:
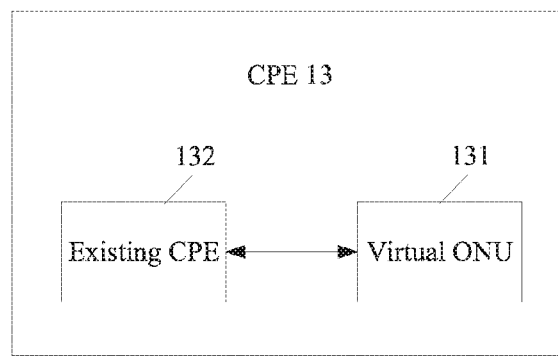
FIG. 2 is an integrated schematic structural diagram of a customer premises equipment provided by Embodiment 1 of the present invention.

In addition, in this embodiment, as shown in FIG. 2, a customer premises equipment can integrate an existing CPE to function as an integrated device, which can be explained specifically as follows. The customer premises equipment 13 obtained through integration can be obtained by connecting an existing CPE132 and a virtual ONU131, where the virtual ONU is a module having the following functions. Connected to the ONU physical converter 12 through the non-PON optical fiber and located on the user side; and configured to realize the ONU control plane function, the PON MAC function, and the quality of service QoS function. Send the upstream first user side physical layer frame to the OLT11 according to the upstream time slice through the ONU physical converter 12 or receive, according to the downstream time slice, the downstream first user side physical layer frame which is sent by the OLT11 through the ONU physical converter 12.

Specifically, the existing CPE132 inside the customer premises equipment 13 can be connected to a UE (User Equipment); and the virtual ONU131 can choose to connect to a CPE through the DSL, the cable TV cable signal, the Ethernet signal, the power cable signal, or the wireless interface. In this case, a second user side physical layer frame is corresponding to a DSL physical layer frame, a power cable physical layer frame, a cable physical layer frame, an Ethernet physical layer frame, or a wireless physical layer frame. For example, when the existing CPE132 connects to the virtual ONU131 through the Ethernet network cable, the second user side physical layer frame is the Ethernet physical layer frame.

In this embodiment, the CPE may be a home gateway, an enterprise network gateway, or a cell gateway; the UE may be a device such as a cell phone, a tablet computer, or a notebook computer.

Further, the access system for the optical fiber network provided in the present invention may include transmission in an upstream direction and in a downstream direction, where the upstream direction is from the CPE to the OLT while the downstream direction is from the OLT to the CPE.

Figure 3:
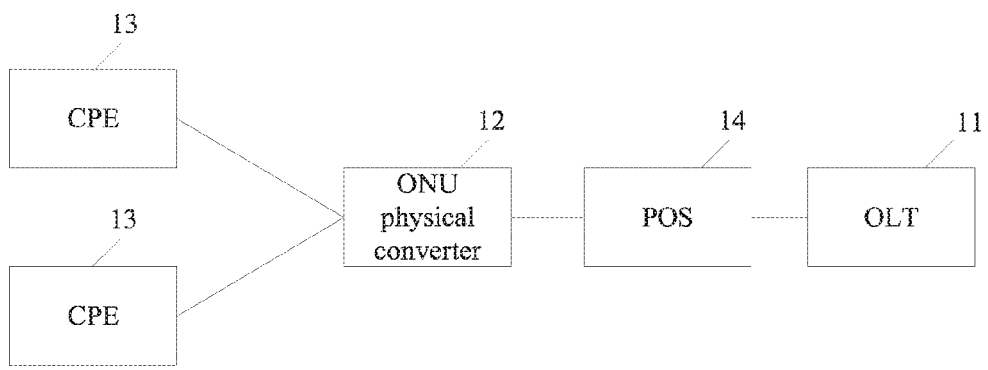
FIG. 3 is a second schematic structural diagram of an access system for an optical fiber network provided by Embodiment 1 of the present invention.

Further, as shown in FIG. 3, the access system includes a POS, configured to receive the PON physical signal sent by the OLT, assign and send the PON physical signal to different ONU physical converters.

In the access system for the optical fiber network provided in this embodiment, the customer premises equipment is established, and the ONU control plane function, the PON MAC function, and the QoS function on the existing ONU are moved downwards to the customer premises equipment. After the forgoing functions are removed from the existing ONU, the existing ONU becomes the ONU physical converter and only has a function of converting the PON physical layer frame and the first user side physical layer frame. Therefore, a carrier does not need to maintain the ONU control plane function, PON MAC function, and QoS function, which lowers maintenance complexity and greatly reduces maintenance costs.

Embodiment 2

Based on an access system for an optical fiber network provided in Embodiment 1 and because the system provided in Embodiment 1 makes an innovative improvement on an existing ONU, where a customer premises equipment located on a user side is established, an ONU control plane function, a PON MAC function, and a QoS function on the existing ONU are moved downwards to the customer premises equipment. After the forgoing functions are removed from the existing ONU, the existing ONU becomes an ONU physical converter and only has a function of converting the PON physical layer frame and the first user side physical layer frame. Meantime, the access system provided in Embodiment 1 also makes an improvement on a protocol stack used for communication in the optical fiber network. Therefore, the present invention also makes an improvement on a communication method for the optical fiber network. Embodiment 2 provides an improved communication method.

Embodiment 2 first describes an improved protocol stack used by the access system.

Figure 4:
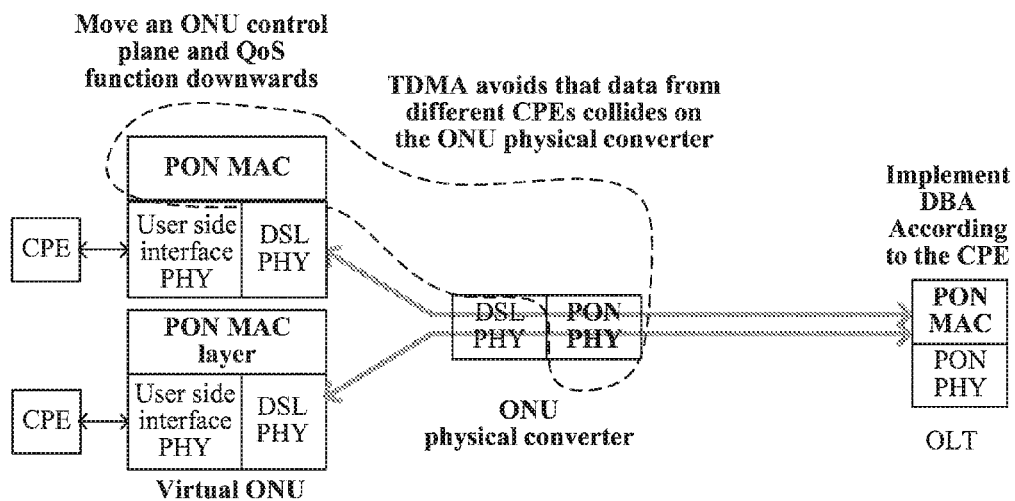
FIG. 4 is a schematic diagram of a protocol stack of a new access system for an optical fiber network provided by Embodiment 2 of the present invention in a case where an Ethernet bridge is not used.

Embodiment 2 uses a connection of the customer premises equipment and the ONU physical converter through a DSL as an example for description. FIG. 4 provides a schematic diagram of a protocol stack of a new access system for the optical fiber network in a case where an Ethernet bridge is not used.

In the protocol stack, a direction from a CPE to an OLT is an upstream direction, and a direction from the OLT to the CPE is a downstream direction; downstream data is transmitted in a TDM (Time-Division Multiplexing) manner while upstream data is transmitted in a TDMA (Time Division Multiple Access) manner.

The OLT is connected to the ONU physical converter through an optical fiber and can implement DBA (Dynamic Bandwidth Allocation) for a connected customer premises equipment to assign an upstream time slice and a downstream time slice for the connected customer premises equipment and send information which includes the upstream time slice and the downstream time slice to the customer premises equipment. The OLT is further configured to send a PON physical layer frame to the ONU physical converter through the optical fiber after the OLT converts a PON MAC layer frame to the PON physical layer frame.

The upstream time slice is configured to indicate a moment when the customer premises equipment sends a first upstream user side physical layer frame to the OLT. Upstream data is sent in the TDMA manner, which can prevent that the upstream data sent by different customer premises equipment collides on a physical converter. The ONU physical converter does not need to perform QoS scheduling any more but performs only a physical layer frame conversion, which can greatly reduce maintenance costs. The downstream time slice is configured to instruct the customer premises equipment to receive a first downstream user side physical layer frame from the OLT.

The ONU physical converter is connected to a plurality of customer premises equipment through DSLs and can complete conversion between the PON physical layer frame (PON PHY) and a DSL physical layer frame (DSL PHY).

The customer premises equipment can receive a user side interface physical layer frame (user side interface PHY) and convert the user side interface physical layer frame to the PON MAC layer frame through completion of the PON MAC function of the customer premises equipment. After the customer premises equipment adds a DSL physical layer frame header to the PON MAC layer frame, the customer premises equipment obtains the DSL physical layer frame (DSL PHY) and sends the DSL physical layer frame to the ONU physical converter through the DSL.

The CPE may be a home gateway, an enterprise network gateway, or a cell gateway and may be respectively used for different access scenarios such as home access, enterprise access, or mobile transmission and access.

Figure 5:
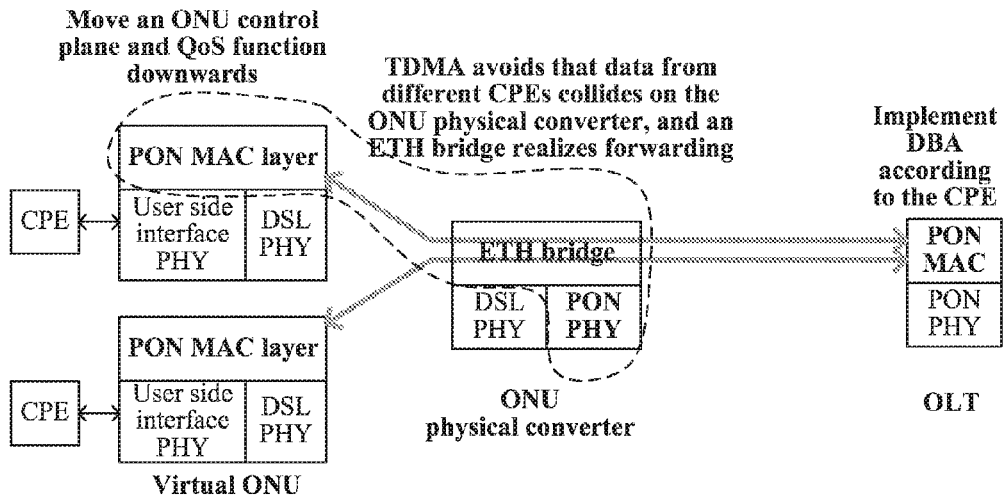
FIG. 5 is a schematic diagram of a protocol stack of a new access system for an optical fiber network provided by Embodiment 2 of the present invention in a case where an Ethernet bridge is used.

FIG. 5 provides a schematic diagram of the protocol stack of the new access system for the optical fiber network in a case where the Ethernet bridge is used, which is different from the protocol stack in FIG. 4. The Ethernet bridge is added in the protocol stack in FIG. 5 to realize data forwarding through different interfaces of the Ethernet bridge. For the protocol stack in FIG. 5, a process for upstream and downstream data transmission is as follows.

After receiving a downstream PON physical layer frame, the ONU physical converter terminates a PON physical layer, adds an Ethernet broadcast frame header to a downstream PON MAC layer frame, and sends the downstream PON MAC layer frame with the Ethernet broadcast frame header to a corresponding DSL physical layer processing unit through the Ethernet bridge. The DSL physical layer processing unit removes the Ethernet broadcast frame header from an Ethernet frame, encapsulates the PON MAC layer frame into the DSL physical layer frame, and sends the DSL physical layer frame to the customer premises equipment.

Reversely, after receiving the downstream PON physical layer frame, the DSL physical layer processing unit terminates a DSL physical layer, and converts the downstream PON physical layer frame to obtain the downstream PON MAC layer frame. After the DSL physical layer processing unit generates the Ethernet frame by adding the Ethernet broadcast frame header to the downstream PON MAC layer frame, the Ethernet frame is forcibly forwarded through the Ethernet bridge. After receiving the Ethernet frame, a PON physical layer processing unit removes the Ethernet broadcast frame header to obtain the PON MAC layer frame, encapsulates the PON MAC layer frame into the PON physical layer frame, and sends the PON physical layer frame to the OLT.

Besides, it should be noted that, in customer premises equipment provided in the present invention, each customer premises equipment has its own ONU ID. In an EPON or a next generation EPON, through modification of a preamble in the Ethernet frame, the Ethernet frame can carry the ONU ID to obtain an EPON MAC layer frame. Therefore, the protocol stack shown in FIG. 5 is more proper for use in the EPON or the next generation EPON.

Secondly, it should be noted in this embodiment that due to the improvement of the protocol stack, a configuration method of the new access system for the optical fiber network is accordingly improved, which is specifically described as follows.

In the prior art, the CPE on the optical fiber network needs to be configured through TR069 (a CPE wide area network management protocol) by various parameters delivered by an automatic configuration server on a network side. Physical parameters of an access line between an ONU and the user side equipment need to be statically configured and then delivered to the user side equipment through the ONU. When the number of ONUs is huge, the maintenance is more difficult and costly.

For example, the connection between the ONU and the user side equipment through the DSL is taken as an example for description. The ONU and the user side equipment require the following physical parameters of a DSL access line: minimum data rate, maximum data rate, minimum data rate in low power state, maximum interleaving delay, or actual interleaving delay.

Meantime, in the prior art, the ONU needs to report various state parameters of the access line to the OLT. For example, when the ONU is connected to the user side equipment through the DSL, the ONU needs to report various state parameters of the DSL access line to the OLT, such as a DSL type, a DSL interface state (DSL Port State), actual upstream and downstream data rate (Actual data rate Up- and Downstream), or attainable upstream and downstream data rate (Attainable data rate Up- and Downstream).

To solve a problem of high costs when a carrier maintains and configures massive ONUs in the prior art, this embodiment provides two improved configuration methods.

Figure 6:
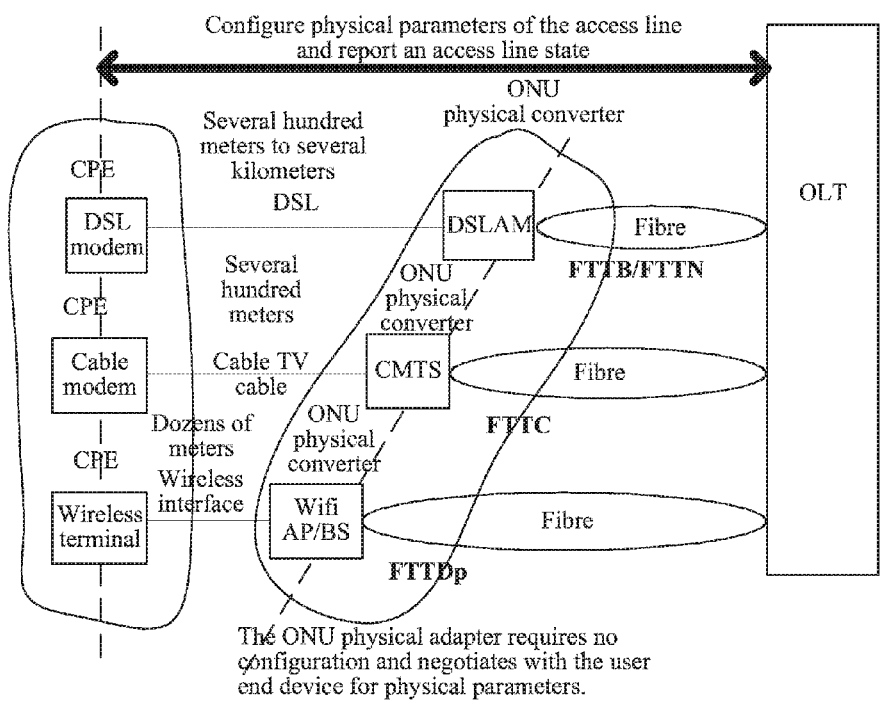
FIG. 6 is a schematic diagram of an access system for an optical fiber network that requires no configuration of an ONU physical converter provided by Embodiment 2 of the present invention.

First, FIG. 6 provides a schematic diagram of the access system for the optical fiber network that requires no configuration of the ONU physical converter, which is described as follows.

In the access system for an optical fiber network shown in FIG. 6, connections between the customer premises equipment and the ONU physical converter respectively through the DSL, a cable TV cable, and a wireless interface are taken as examples. Corresponding deployment manners are respectively FTTB (Fibre To The Building)/FTTN (Fibre To The Node), FTTC (Fibre To The Curb), and FTTDp (Fibre to Drop/Distribution Point). Moreover, a DSL modem, a cable modem (cable TV cable modem), and a wireless terminal are integrated in the customer premises equipment. A DSLAM (DSL Access Multiplexer), a CMTS (Cable Modem Termination System), and a Wi-Fi AP (Access Point)/BS (Base Station) are integrated with the ONU physical converter.

In the access system for the optical fiber network shown in FIG. 6, a configuration management manner of the ONU physical converter originally maintained by the carrier is exchanged with a configuration management manner of the customer premises equipment on the user side. Configuration of physical parameters of the access line between the ONU and the user side equipment is transferred to the customer premises equipment. The ONU physical converter requires no configuration of the physical parameters and only needs to forward the physical parameters. Report of state parameters of the access line is also transferred to the customer premises equipment. The carrier does not need to maintain configuration management of the ONU physical converter. This greatly reduces maintenance costs.

Moreover, the ONU physical converter can negotiate with the customer premises equipment to obtain the physical parameters of the access line. The customer premises equipment rather than the ONU physical converter reports the state parameters of the access line to the OLT.

The physical parameters of the access line can be configured on the customer premises equipment through a PON management plane protocol. All state parameters of the access line can also be reported through the PON management plane protocol.

For example, for a GPON or a next generation GPON, the customer premises equipment supports an OMCI (ONT Management and Control Interface) protocol to configure and manage the customer premises equipment and to configure the physical parameters of the access line or report the state parameters of the access line. For the EPON or the next generation EPON, the customer premises equipment supports an ETH OAM (ETH Operation Administration and Maintenance) protocol to configure and manage the customer premises equipment, and to complete the configuration of the physical parameters of the access line and the report of all the state parameters of the access line.

Further, the customer premises equipment and the CPE can be integrated into a device. Therefore, the physical parameters of the access line can also be configured by using a configuration protocol (such as TR-069) of the CPE.

Figure 7:
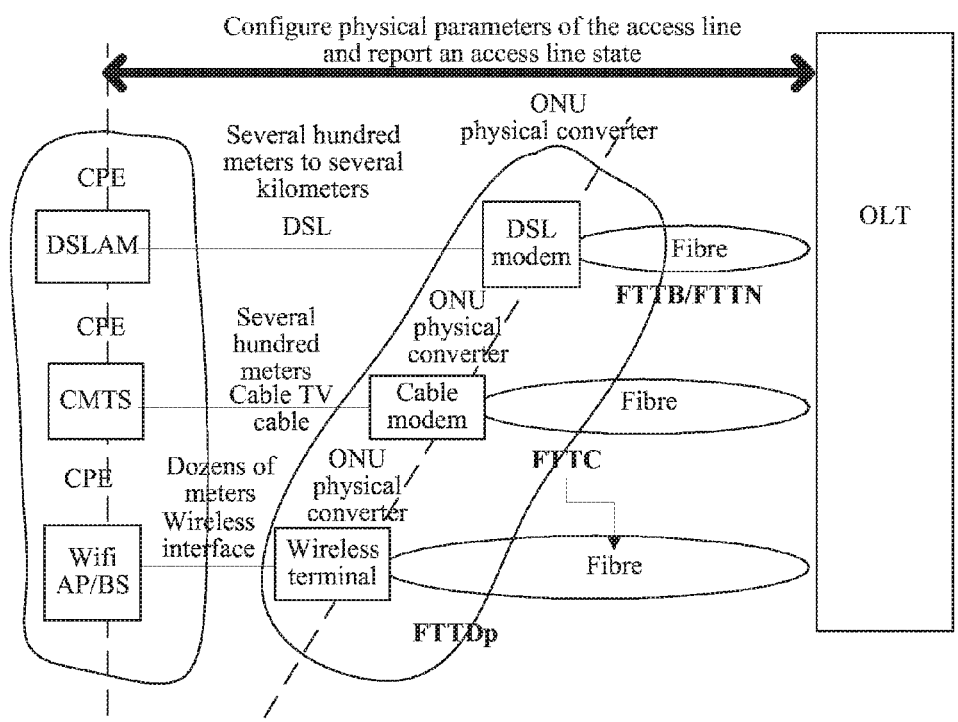
FIG. 7 is another schematic diagram of an access system for an optical fiber network that requires no configuration of an ONU physical converter provided by Embodiment 2 of the present invention.

Second, FIG. 7 provides another schematic diagram of the access system for the optical fiber network that requires no configuration of the ONU physical converter, which is described as follows.

Different from the first configuration manner, in the second configuration manner, a physical layer of the customer premises equipment and a physical layer of the ONU physical converter on both sides of the access line are exchanged, namely, a physical layer processing function of a user side access line of the existing ONU is moved downwards to the user side equipment (customer premises equipment) in front of the CPE, and the physical layer processing function of the access line of the user side equipment in front of the original CPE is moved upwards to an access node ONU (ONU physical converter).

Specifically, in the access system for the optical fiber network shown in FIG. 7, the connections between the customer premises equipment and the ONU physical converter respectively through the DSL, the cable TV cable, and the wireless interface are taken as examples. Corresponding deployment manners are respectively FTTB/FTTN, FTTC, and FTTDp. The DSL modem, the cable modem, and the wireless terminal are integrated in the ONU physical converter. The DSLAM, the CMTS, and the Wi-Fi AP/BS are integrated with the customer premises equipment.

In the second configuration manner, only physical layer chips of the ONU physical converter and the user side equipment need to be exchanged. For example, if the customer premises equipment and the ONU physical converter are connected to each other through the DSL, the DSL Modem rather than the DSLAM is built in the ONU physical adapter. The customer premises equipment has a DSL physical layer processing function (that is a DSLAM function of a single interface) of the existing ONU. The CPE in the customer premises equipment is interconnected with the DSL Modem through the DSLAM of the single interface. The DSLAM of the single interface does not have an interface aggregation function but can be built in the CPE. The ONU physical adapter can have a plurality of DSL Modems and support a plurality of DSL interfaces.

Similarly, as shown in FIG. 7, if the customer premises equipment is connected to the ONU physical converter by using the cable TV cable, the Cable Modem rather than the CMTS is built in the ONU physical adapter. The customer premises equipment has a Cable physical layer processing function (that is a CMTS function of a single interface) of the original ONU. The CPE is interconnected with the Cable Modem through the CMTS of the single interface. Actually, the CMTS of the single interface does not have the interface aggregation function, and can also be built in the CPE. The ONU physical adapter can have a plurality of Cable Modems and support a plurality of cable TV cable interfaces.

Similarly, as shown in FIG. 7, if the customer premises equipment is connected to the ONU physical converter by using wireless technology, the wireless terminal rather than the BS/AP is built in the ONU physical adapter. The customer premises equipment has a wireless physical layer processing function (that is a BS/AP function) of the original ONU. The CPE in the customer premises equipment is connected to the wireless terminal through the BS/AP. Actually, the BS/AP supports access of only one wireless terminal of the ONU physical converter on the network side and can also be built in the CPE. The ONU physical adapter can have a plurality of wireless terminals and support a plurality of customer premises equipment.

In the second configuration manner provided in this embodiment, through exchanging of the physical layer chips of the ONU physical converter and the user side equipment (integrated with the customer premises equipment), the configuration of the physical parameters of the access line from the ONU to the user side equipment is transferred to the customer premises equipment. The ONU physical converter requires no configuration of the physical parameters and only needs to forward the physical parameters. The report of the state parameters of the access line is also transferred to the customer premises equipment. The carrier does not need to maintain configuration management of the ONU physical converter. This greatly reduces maintenance costs.

Figure 8:
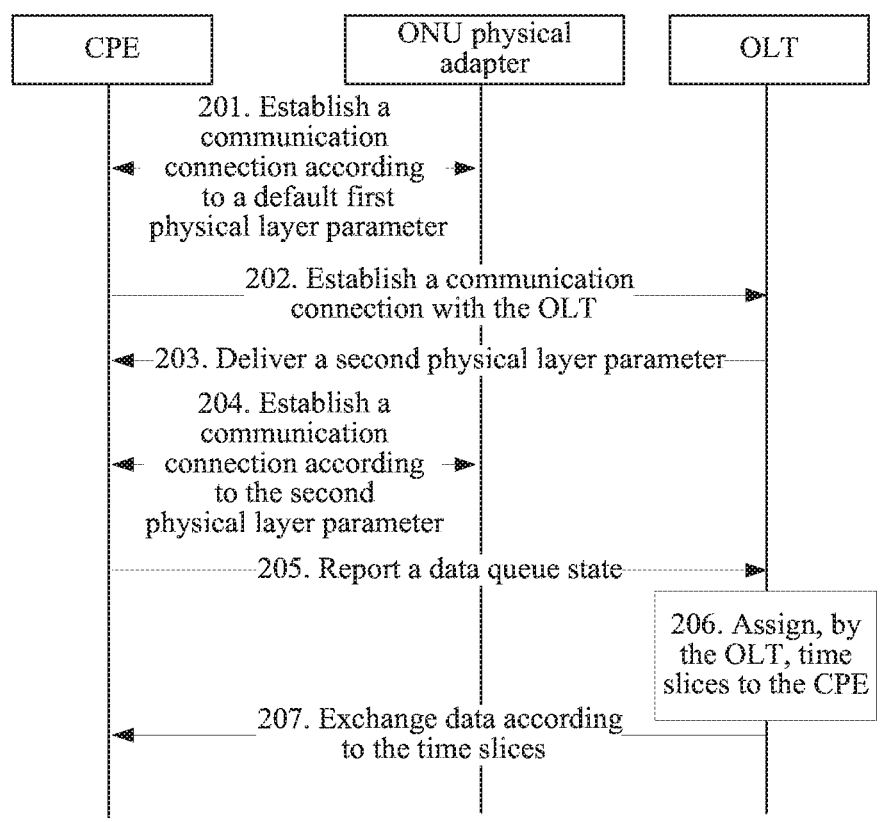
FIG. 8 is a schematic flowchart of a communication method based on an access system for an optical fiber network provided by Embodiment 2 of the present invention.

Furthermore, according to the improvement of the present invention on the protocol stack and physical parameter configuration manner of the access system for the optical fiber network, the communication method based on the access system for the optical fiber network is provided. As shown in FIG. 8, the communication method specifically includes the following steps.

Step 201: Establish, by the customer premises equipment, a communication connection with the ONU physical converter according to a default first physical layer parameter, where the default first physical layer parameter is reserved on the customer premises equipment and the ONU physical converter.

The connection between the customer premises equipment and the ONU physical converter through the DSL is taken as an example for description. The first physical layer parameter may include the following: minimum data rate, maximum data rate, minimum data rate in low power state, maximum interleaving delay, or actual interleaving delay.

Step 202: Establish, by the customer premises equipment, a communication connection with the OLT.

Step 203: Receive, by the customer premises equipment, a second physical layer parameter delivered by the OLT, where the second physical layer parameter is a new physical layer parameter or an updated physical layer parameter delivered by the OLT.

Step 204: Negotiate, by the customer premises equipment, with the ONU physical converter and establish a communication connection according to the second physical layer parameter delivered by the OLT.

Step 205: Report, by the customer premises equipment, a data queue state to the OLT.

Step 206: Assign, by the OLT, time slices to the customer premises equipment.

The time slices include the upstream time slice and the downstream time slice. After completing time slice assignment, the OLT sends configuration information which includes the upstream time slice and the downstream time slice to the customer premises equipment. The upstream time slice is used to indicate a moment when the customer premises equipment sends upstream data to the OLT, and the downstream time slice is used to indicate a moment when the customer premises equipment receives downstream data sent by the OLT.

Step 207: Exchange, by the customer premises equipment, data with the OLT according to the time slices.

Further, after the establishing a communication connection between the customer premises equipment and the OLT in step 207, the method may include the following.

Reporting, by the customer premises equipment, a physical line state of the communication connection with the OLT to the OLT.

Figure 9:
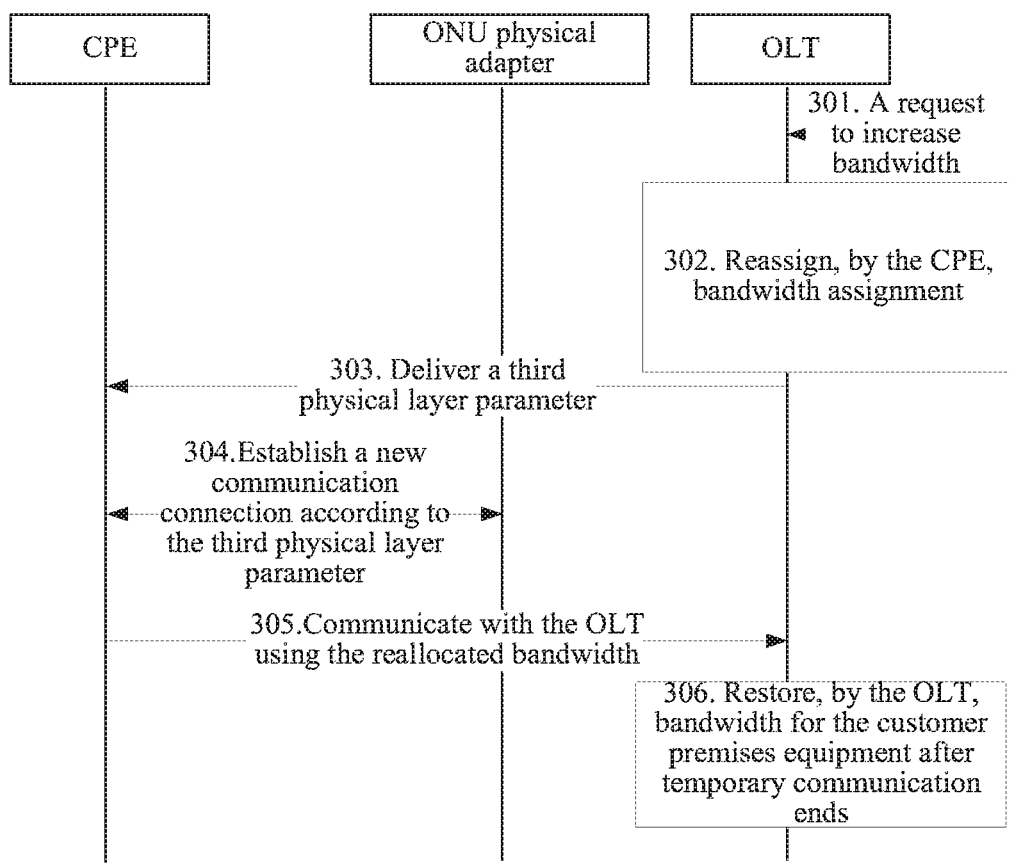
FIG. 9 is a schematic flowchart of a method for adjusting bandwidth online based on an access system for an optical fiber network provided by Embodiment 2 of the present invention.

Further, after completing the establishment of the communication connection, this embodiment further provides a method for adjusting bandwidth online. As shown in FIG. 9, the method specifically includes the following steps.

Step 301: Receive, by the OLT, a request to increase bandwidth for temporary communication of a user, where the request to increase the bandwidth for the temporary communication may be temporarily sent by the user or reserved for the user in advance. After the reserved time is reached, the request is sent by a carrier network side to the OLT or is actively sent by the carrier to the OLT or the like.

Step 302: Reassign, by the OLT, bandwidth to the customer premises equipment, and obtain a third physical layer parameter according to current bandwidth assignment.

Step 303: Deliver, by the OLT, the third physical layer parameter to the customer premises equipment.

Step 304: Establish, by the customer premises equipment, a new communication connection with the ONU physical converter according to the third physical layer parameter.

Step 305: Obtain, by the customer premises equipment, the reassigned bandwidth and use the reassigned bandwidth to communicate with the OLT.

Step 306: Restore, by the OLT, bandwidth for the customer premises equipment after the temporary communication ends, where the restoring, by the OLT, bandwidth for the customer premises equipment specifically includes the following steps.

Step 306-1: Deliver, by the OLT, the second physical layer parameter to the customer premises equipment.

Step 306-2: Re-establish, by the customer premises equipment, a new communication connection with the ONU physical converter according to the second physical layer parameter.

Step 306-3: Re-establish, by the customer premises equipment, a communication connection with the OLT to restore the bandwidth before the temporary communication for the customer premises equipment.

This embodiment provides the communication method based on the access system of the optical fiber network in Embodiment 1. In this method, the customer premises equipment establishes the communication connection with the OLT through the physical layer parameters which is delivered by the OLT to the customer premises equipment, and the ONU physical converter maintained by the carrier side requires no configuration, which saves maintenance costs of the carrier. The customer premises equipment directly reports the physical line state to the OLT without participation of the ONU physical converter. The customer premises equipment sends and receives data according to the upstream time slice and the downstream time slice; therefore, no data collision occurs. The PON control plane of the ONU physical converter does not need to be maintained, which also saves maintenance costs of the carrier.

Embodiment 3

This embodiment provides a customer premises equipment, where the customer premises equipment is connected to an ONU physical converter through a non-PON optical fiber and is located on a user side, and is configured to realize an ONU control plane function and a PON MAC function, send a first user side physical layer frame to the OLT through the ONU physical converter according to an upstream time slice assigned by an OLT, or receive, according to a downstream time slice assigned by the OLT, a first user side physical layer frame which is sent by the OLT through the ONU physical converter.

Further, the customer premises equipment is configured to receive a second physical layer parameter which is delivered by the OLT through the ONU physical converter and establish a new communication connection with the ONU physical converter according to the second physical layer parameter delivered by the OLT.

The customer premises equipment is further configured to the following. Before receiving the second physical layer parameter which is delivered by the OLT through the ONU physical converter, establish a communication connection with the ONU physical converter according to a default first physical layer parameter and establish a communication connection with the OLT. The default first physical layer parameter is reserved on the customer premises equipment.

Further, the customer premises equipment is configured to report a physical line state of the communication connection with the OLT to the OLT through the ONU physical converter.

Figure 10:
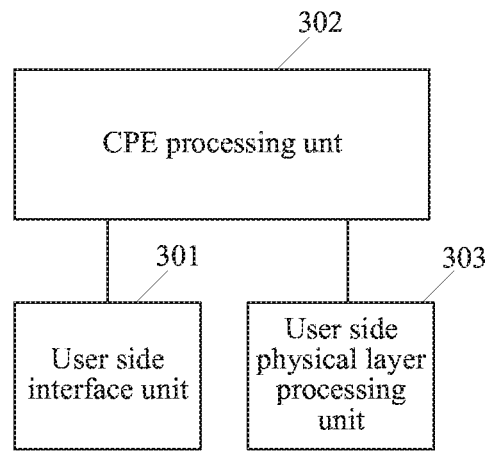
FIG. 10 is a schematic structural diagram of a customer premises equipment provided by Embodiment 3 of the present invention.

Further, as shown in FIG. 10, the customer premises equipment specifically includes the following units. A user side interface unit 301 is configured to receive an upstream second user side physical layer frame sent by a user or send a downstream second user side physical layer frame to the user. A virtual ONU processing unit 302 is configured to realize the ONU control plane function, the PON MAC function, and a quality of service QoS function, encapsulate the upstream second user side physical layer frame into an upstream PON MAC layer frame, send the upstream PON MAC layer frame to the ONU physical converter through a user side physical layer processing unit 303 according to the upstream time slice assigned by the OLT or receive, according to the downstream time slice assigned by the OLT, a downstream PON MAC layer frame sent by the user side physical layer processing unit 303, convert the downstream PON MAC layer frame to the downstream second user side physical layer frame, and send the downstream second user side physical layer frame to the user side physical layer processing unit 303 through the user side interface unit 301.

It should be noted that the ONU control plane function includes the following. Working with the OLT to complete ranging of the customer premises equipment so that the OLT can assign the upstream time slice and the downstream time slice to the customer premises equipment according the ranging result, and optionally supporting the receiving of configuration of physical parameters of an access line and the report of all state parameters of the access line.

The PON MAC function includes: completing framing of the PON MAC layer frame.

The QoS function includes: establishing a queue and an assignment priority of upstream data for the customer premises equipment. The user side physical layer processing unit 303, configured to convert the upstream PON MAC layer frame sent by the virtual ONU processing unit 302 to an upstream first user side physical layer frame corresponding to a non-PON physical signal and send the upstream first user side physical layer frame to the ONU physical converter through the non-PON physical signal; or receive a downstream first user side physical layer frame sent by the ONU physical converter, convert the downstream first user side physical layer frame to the downstream PON MAC layer frame, and send the downstream PON MAC layer frame to the virtual ONU processing unit 302.

Figure 11:
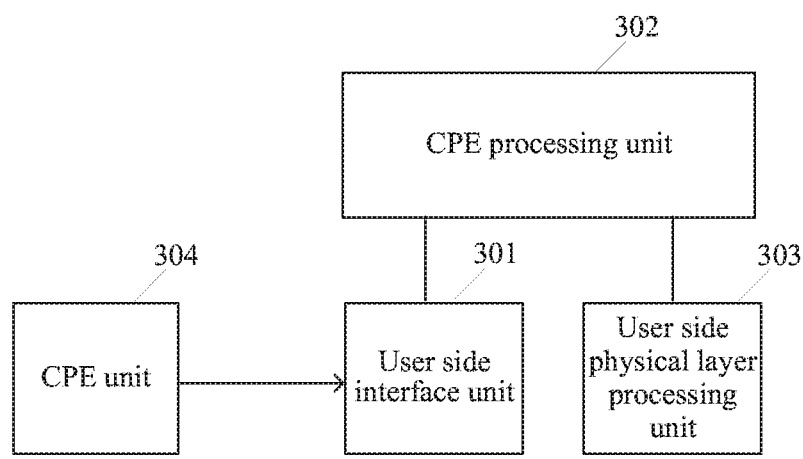
FIG. 11 is a second schematic structural diagram of a customer premises equipment provided by Embodiment 3 of the present invention.

Further, as shown in FIG. 11, the customer premises equipment also includes a CPE unit 304, where the CPE unit 304 is connected to the user side interface unit 301 and a user equipment UE and is configured to receive the downstream second user side physical layer frame sent by the user side interface unit 301 and forward the downstream second user side physical layer frame to the UE, or receive upstream data sent by the UE, convert the upstream data to an upstream second user side physical layer frame, and send the upstream second user side physical layer frame to the user side interface unit 301.

Figure 12:
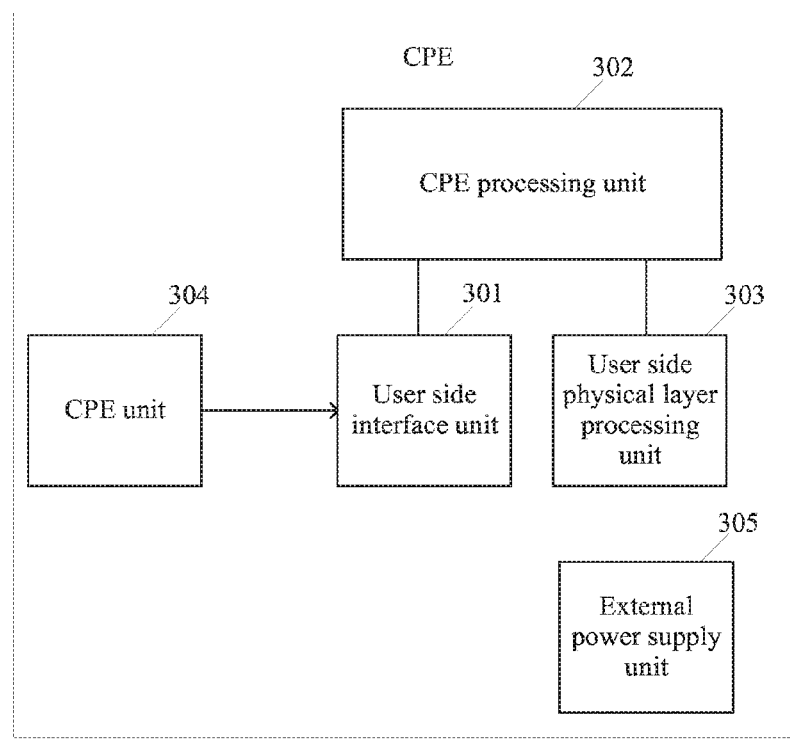
FIG. 12 is a third schematic structural diagram of a customer premises equipment provided by Embodiment 3 of the present invention.

Further, as shown in FIG. 12, the customer premises equipment includes an external power supply unit 305, which is configured to provide power for the ONU physical converter.

This embodiment provides the customer premises equipment, where the ONU control plane function, the PON MAC function, and the QoS function on an existing ONU are moved downwards to the customer premises equipment. After the forgoing function modules are removed from the existing ONU, the existing ONU becomes the ONU physical converter and only has a function of converting the PON physical layer frame and the first user side physical layer frame conversion function. Therefore, a carrier does not need to maintain the ONU control plane function, the PON MAC function, and the QoS function, which lowers maintenance complexity and greatly reduces maintenance costs.

Embodiment 4

This embodiment provides an ONU physical converter, where the ONU physical converter is connected to an OLT through an optical fiber and is configured to receive a PON physical layer frame which is sent by the OLT through a PON physical signal, convert the PON physical layer frame to a first user side physical layer frame corresponding to a non-PON physical signal, and send the first user side physical layer frame to a customer premises equipment through the non-PON physical signal; or receive a first user side physical layer frame which is sent by the customer premises equipment through the non-PON physical signal, convert the first user side physical layer frame to a PON physical layer frame corresponding to the PON physical signal, and send the PON physical layer frame to the OLT through the PON physical signal.

Further, the ONU physical converter is further configured to forward to the customer premises equipment a second physical layer parameter delivered by the OLT and establish a new communication connection with the customer premises equipment according to the second physical layer parameter delivered by the OLT.

Further, the ONU physical converter is further configured to establish a communication connection with the customer premises equipment according to a default first physical layer parameter before the customer premises equipment receives the second physical layer parameter which is forwarded by the OLT through the ONU physical converter. The default first physical layer parameter is reserved on the customer premises equipment.

Further, the ONU physical converter is further configured to forward to the OLT a physical line state of the communication connection reported by the customer premises equipment.

It should be noted that this embodiment provides two manners for the ONU physical converter to convert data, and in the first manner, a conversion manner of an upstream direction and a conversion manner of a downstream direction are included, which is specifically described as follows.

In the first manner:

1. Description of the Upstream Direction

Figure 13:
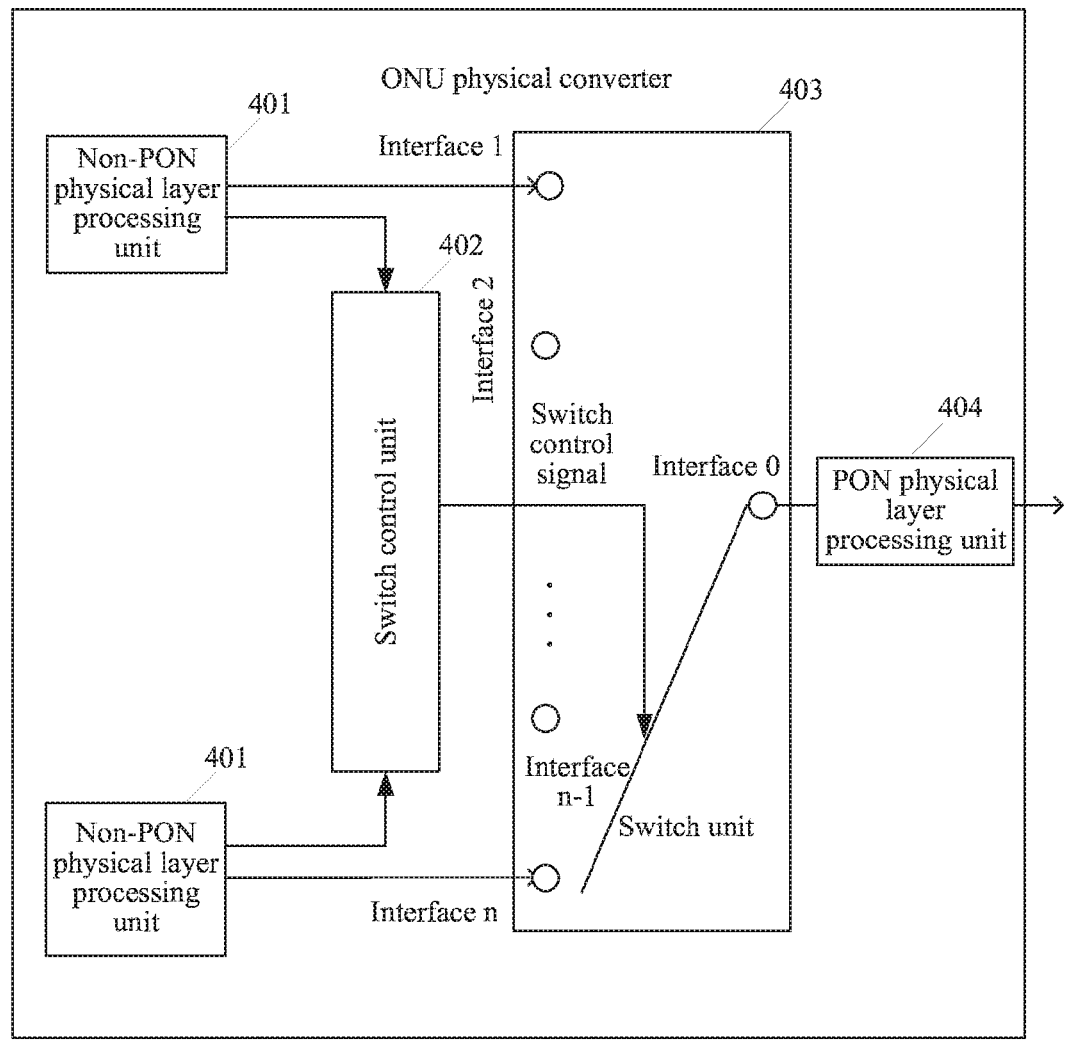
FIG. 13 is a schematic structural diagram of an ONU physical converter provided by Embodiment 4 of the present invention.

As shown in FIG. 13, the ONU physical converter includes: a non-PON physical layer processing unit 401, a switch control unit 402, a switch unit 403, and a PON physical layer processing unit 404. The non-PON physical layer processing unit 401 is configured to receive an upstream first user side physical layer frame which is sent by the customer premises equipment through the non-PON physical signal and convert the upstream first user side physical layer frame to an upstream PON MAC layer frame.

The switch control unit 402 is configured to generate a switch control signal corresponding to the customer premises equipment when receiving the upstream PON MAC layer frame sent by the customer premises equipment and send the switch control signal corresponding to the customer premises equipment to the switch unit 403.

The switch unit 403, including one output interface 0 and at least one input interface 1-n, where there is one-to-one correspondence between the input interface 1-n and the customer premises equipment connected to the ONU physical converter, is configured to connect, according to the switch control signal corresponding to the customer premises equipment, a channel between an input interface corresponding to the customer premises equipment and an output interface. The channel is configured for the non-PON physical layer processing unit 401 to send the upstream PON MAC layer frame obtained through conversion by the non-PON physical layer processing unit 401 to the PON physical layer processing unit 404. The PON physical layer processing unit 404 is configured to convert the upstream PON MAC layer frame to an upstream PON physical layer frame and send the upstream PON physical layer frame to the OLT through the PON physical signal.

The following describes data conversion in the upstream direction with examples.

Figure 14A:
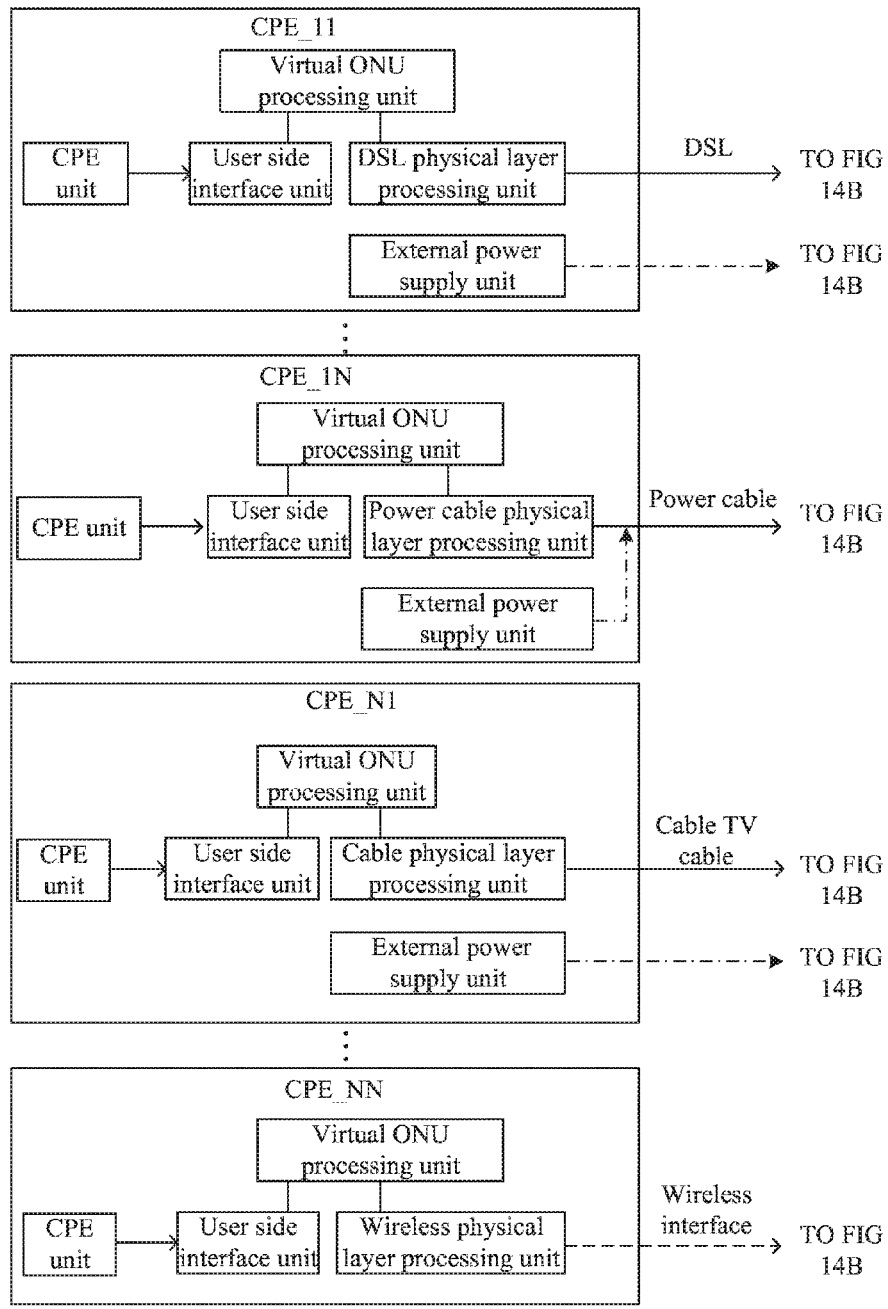
FIGS. 14A-14B is a schematic construction diagram of an access system for an optical fiber network provided by Embodiment 4 of the present invention.
Figure 14B:
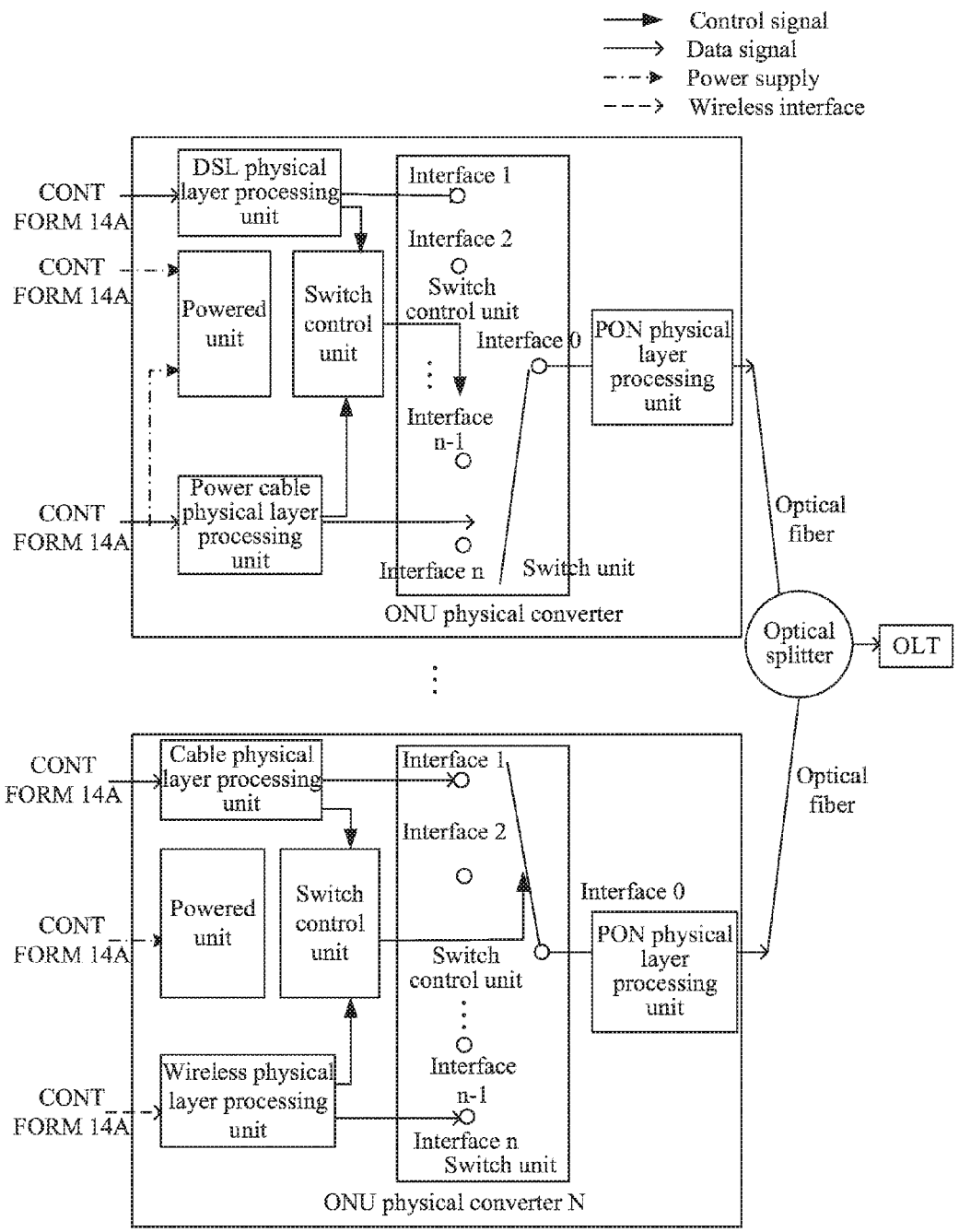

As shown in FIG. 14, an architecture diagram of an access system for an optical fiber network is provided to realize upstream communications. The system includes the OLT, a plurality of ONU physical converters connected to the OLT through optical fibers, and a plurality of customer premises equipment connected to the ONU physical converter. The access system is applicable to a situation that a small number of customer premises equipment are connected to each ONU physical converter.

In this embodiment, connections between the customer premises equipment and the ONU physical converter through a DSL, a power cable, a cable TV cable, an Ethernet network cable, and a wireless interface are taken as examples for description. Accordingly, a non-PON physical layer processing unit in this embodiment can be specifically a DSL physical layer processing unit, a power cable physical layer processing unit, a cable physical layer processing unit, an Ethernet physical layer processing unit, and a wireless physical layer processing unit.

Accordingly, the upstream first user side physical layer frame can be respectively an upstream first DSL physical layer frame, an upstream first power cable physical layer frame, an upstream first cable physical layer frame, an upstream first Ethernet physical layer frame, and an upstream first wireless physical layer frame.

For example, as shown in FIG. 14, a customer premises equipment_11 is connected to an ONU physical converter_1 through the DSL, and then the non-PON physical layer processing unit corresponding to the customer premises equipment_11 is specifically the DSL physical layer processing unit. A customer premises equipment_1N is connected to the ONU physical converter_1 through the power cable, and then the non-PON physical layer processing unit corresponding to the customer premises equipment_1N is specifically the power cable physical layer processing unit. A customer premises equipment_N1 is connected to an ONU physical converter_N through the cable TV cable, and then the non-PON physical layer processing unit corresponding to the customer premises equipment_N1 is specifically the cable physical layer processing unit. A customer premises equipment_NN is connected to the ONU physical converter_N through the wireless interface, and then the non-PON physical layer processing unit corresponding to the customer premises equipment_NN is specifically the wireless physical layer processing unit.

For FIG. 14, further, the customer premises equipment can also be connected to the ONU physical converter through the Ethernet network cable, and then the non-PON physical layer processing unit corresponding to the customer premises equipment is specifically the Ethernet physical layer processing unit.

Specifically, the non-PON physical layer processing unit converts the upstream first user side physical layer frame to the upstream PON MAC layer frame, which can be as follows. The non-PON physical layer processing unit removes an upstream first user side physical layer frame header from the upstream first user side physical layer frame and obtains the upstream PON MAC layer frame.

The connection between the customer premises equipment and the ONU physical converter through the DSL is used as an example for description. The DSL physical layer processing unit converts the upstream first DSL physical layer frame to the upstream PON MAC layer frame. The DSL physical layer processing unit removes a DSL physical layer frame header from the upstream first DSL physical layer frame and obtains the upstream PON MAC layer frame.

The PON physical layer processing unit is configured to convert the upstream PON MAC layer frame to the upstream PON physical layer frame and send the upstream PON physical layer frame to the OLT through the PON physical signal.

The switch control unit is configured to generate the switch control signal corresponding to the customer premises equipment when receiving the upstream PON physical layer frame sent by the customer premises equipment and send the switch control signal corresponding to the customer premises equipment to the switch unit. The switch unit includes one output interface and at least one input interface, and there is one-to-one correspondence between the input interface and the customer premises equipment connected to the ONU physical converter. For example, in Embodiment 1, an interface 0 is the output interface, and an interface 1 to an interface n are input interfaces.

The forgoing switch control signal is used to instruct the switch unit to connect the input interface corresponding to the switch control signal and the output interface to form a channel.

A powered unit is configured to obtain electrical energy from the external power supply unit in the customer premises equipment to realize obtaining power from a user side, which can solve the problem of difficulties in long-distance power supply for the ONU for a carrier.

It should be further noted that when the customer premises equipment is connected to the ONU physical converter through the power cable, power can be supplied directly through the power cable.

The switch unit is configured to connect, according to the switch control signal, the channel between an input interface corresponding to the customer premises equipment and an output interface, where the channel is configured to send the upstream PON MAC layer frame obtained through conversion by the non-PON physical layer processing unit corresponding to the customer premises equipment to the PON physical layer processing unit.

For example, as shown in FIG. 14, when the customer premises equipment_1N sends a first upstream user side physical layer frame to the OLT, the power cable physical layer processing unit notifies the switch control unit, the switch control unit sends the switch control signal to the switch unit, and the switch unit connects the interface n and the interface 0 to form a channel after the switch unit receives the switch control signal. The customer premises equipment can then send the upstream PON physical layer frame to the OLT through the power cable physical layer processing unit.

The ONU physical converter may also include a PON optical module, where the PON optical module is located in an upstream direction of the PON physical layer processing unit, and the ONU physical converter sends the PON physical signal to the OLT through the PON optical module. Accordingly, the switch control signal can further be configured to control whether the PON optical module glows or not.

Figure 15:
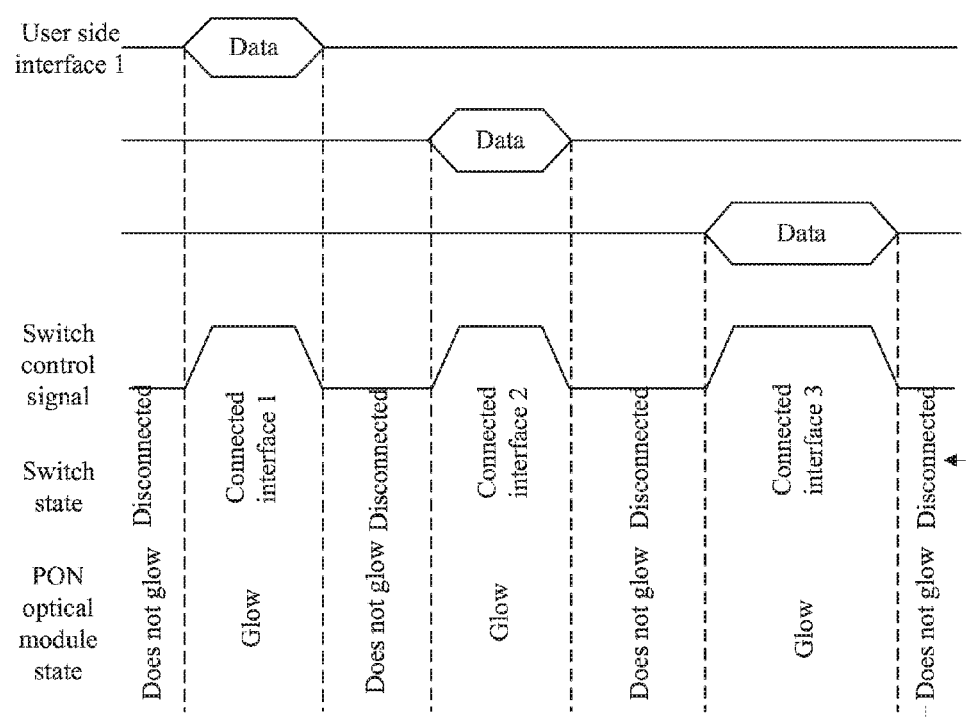
FIG. 15 is a schematic diagram for correspondence between user side interfaces and a switch control signal and a PON optical module state provided by Embodiment 4 of the present invention.

FIG. 15 is a schematic diagram of correspondence between user side interfaces and the switch control signal and PON optical module state provided by this embodiment. The customer premises equipment sends the first upstream user side physical layer frame to the OLT according to an upstream time slice assigned by the OLT.

2. Description of the Downstream Direction.

The following describes data conversion in the downstream direction with examples.

Figure 16:
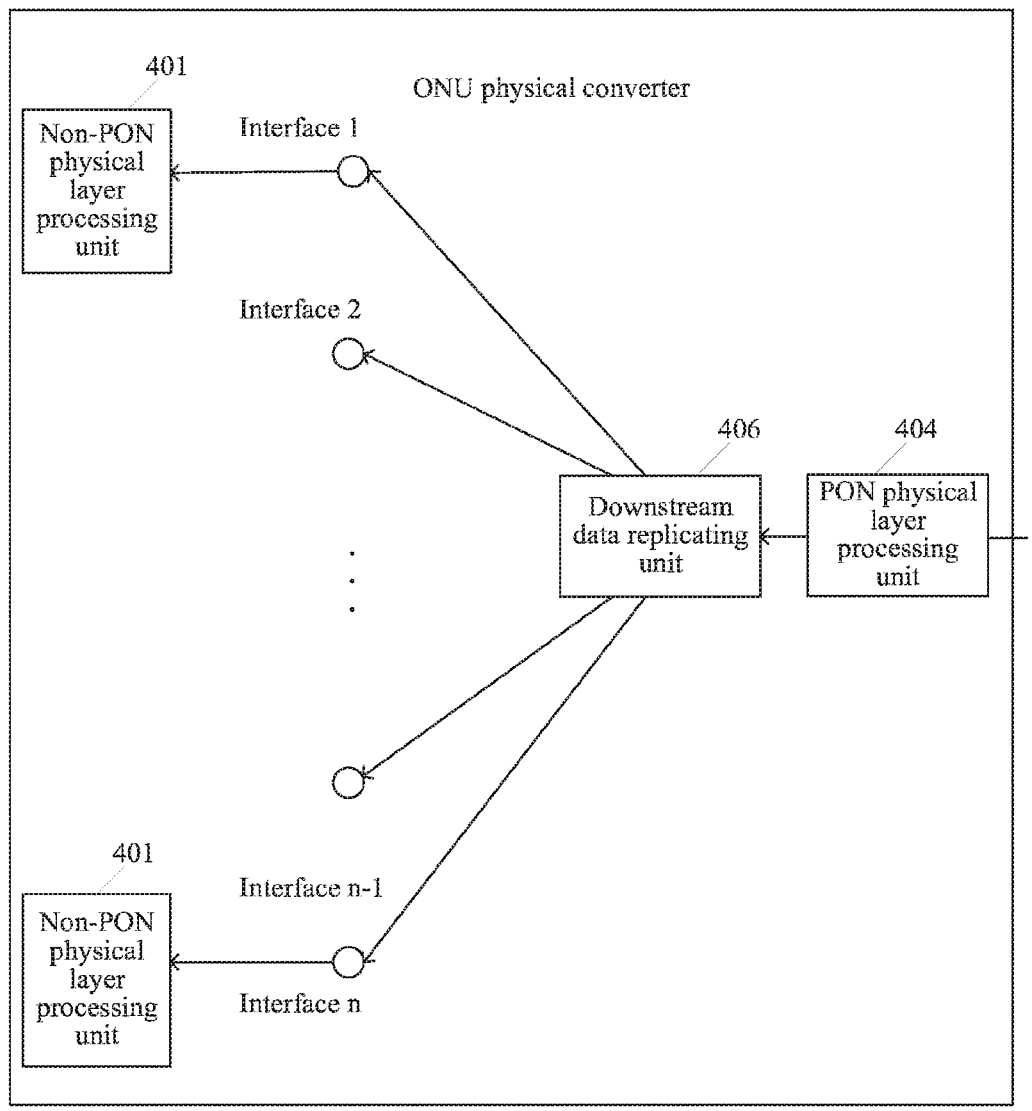
FIG. 16 is a second schematic structural diagram of an ONU physical converter provided by Embodiment 4 of the present invention.

Further, as shown in FIG. 16, the ONU physical converter includes the following. A PON physical layer processing unit 404, a non-PON physical layer processing unit 401, and interfaces 1-n respectively corresponding to customer premises equipments connected to the ONU physical converter, and a downstream data replicating unit 406. The PON physical layer processing unit 404 is configured to receive a downstream PON physical layer frame sent by the OLT through the PON physical signal and convert the downstream PON physical layer frame to a downstream PON MAC layer frame.

Interfaces 1-n are configured respectively to connect lines between the downstream data replicating unit 406 and the non-PON physical layer processing unit 401, where the lines are configured to send the downstream PON MAC layer frame obtained through conversion by the PON physical layer processing unit 404 to the non-PON physical layer processing unit 401.

The downstream data replicating unit 406 is configured to replicate the downstream PON MAC layer frame obtained through conversion by the PON physical layer processing unit 404 to all lines which belong to the ONU physical converter.

The non-PON physical layer processing unit 401 is configured to convert the downstream PON MAC layer frame to the downstream first user side physical layer frame and send the downstream first user side physical layer frame to the customer premises equipment through the non-PON physical signal.

The following describes data conversion in the upstream direction with examples.

Figure 17A:
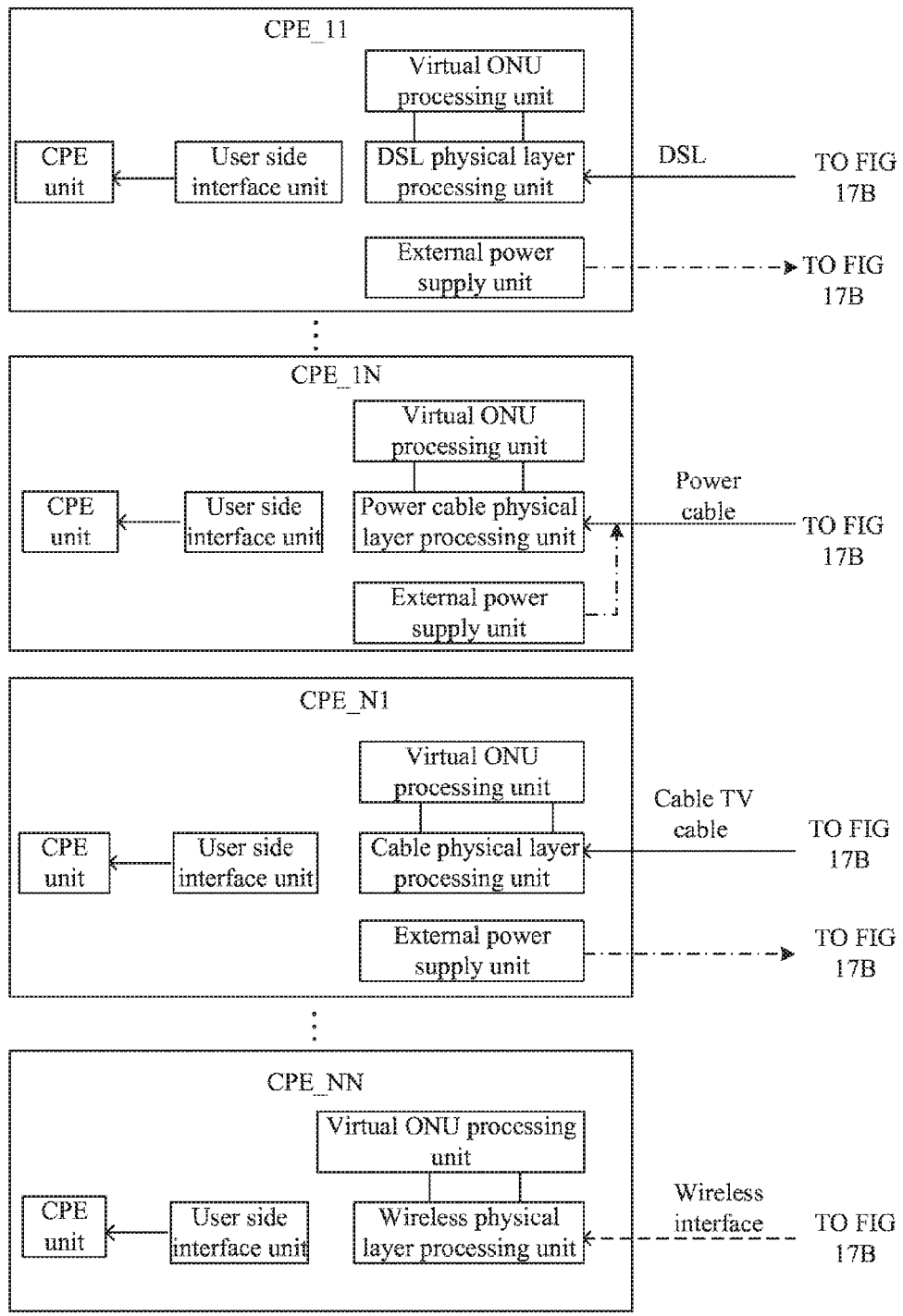
FIGS. 17A-17B is a second schematic construction diagram of an access system for an optical fiber network provided by Embodiment 4 of the present invention.
Figure 17B:
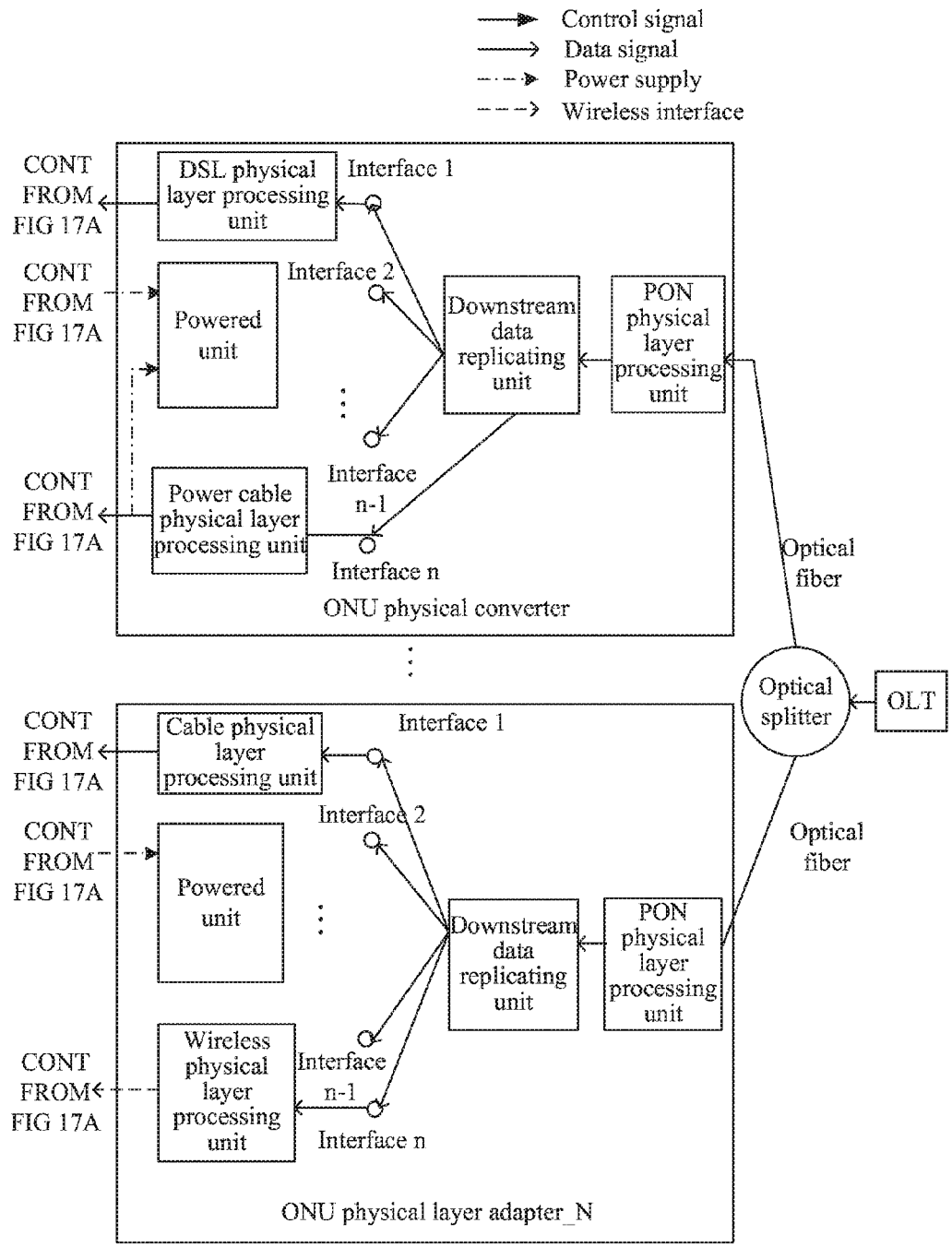

As shown in FIG. 17, an architecture diagram of the access system for the optical fiber network is provided to realize downstream communications. The system includes the OLT, a plurality of ONU physical converters connected to the OLT through optical fibers, and a plurality of customer premises equipments connected to the ONU physical converter. The access system is applicable to a situation that a small number of customer premises equipments are connected to each ONU physical converter.

The following provides specific descriptions.

The ONU physical converter specifically includes a PON physical layer processing unit, a non-PON physical layer processing unit, and interfaces respectively corresponding to customer premises equipments connected to the ONU physical converter, and a downstream data replicating unit. The PON physical layer processing unit is configured to receive the downstream PON physical layer frame which is sent by the OLT through the PON physical signal and convert the downstream PON physical layer frame to the downstream PON MAC layer frame. The non-PON physical layer processing unit is configured to convert the downstream PON MAC layer frame to a downstream first user side physical layer frame corresponding to the non-PON physical signal and send the downstream first user side physical layer frame to the customer premises equipment through the non-PON physical signal.

Similar to the foregoing description, in this embodiment, connections between the customer premises equipment and the ONU physical converter through the DSL, the power cable, the cable TV cable, the Ethernet network cable, and the wireless interface are taken as examples for description. Accordingly, the non-PON physical layer processing unit in this embodiment is specifically the DSL physical layer processing unit, the power cable physical layer processing unit, the cable physical layer processing unit, the Ethernet physical layer processing unit, and the wireless physical layer processing unit.

Accordingly, the downstream first user side physical layer frame is respectively a downstream first DSL physical layer frame, a downstream first power cable physical layer frame, a downstream first cable physical layer frame, and a downstream first wireless physical layer frame.

For example, as shown FIG. 17, a customer premises equipment_11 is connected to an ONU physical converter_1 through the DSL, and then the non-PON physical layer processing unit corresponding to the customer premises equipment_11 is specifically the DSL physical layer processing unit. A customer premises equipment_1N is connected to the ONU physical converter_1 through the power cable, and then the non-PON physical layer processing unit corresponding to the customer premises equipment_1N is specifically the power cable physical layer processing unit. A customer premises equipment_N1 is connected to an ONU physical converter_N through the cable TV cable, and then the non-PON physical layer processing unit corresponding to the customer premises equipment_N1 is specifically the cable physical layer processing unit. A customer premises equipment_NN is connected to the ONU physical converter_N through the wireless interface, and then the non-PON physical layer processing unit corresponding to the customer premises equipment_NN is specifically the wireless physical layer processing unit.

Further, for FIG. 17, the customer premises equipment can also be connected to the ONU physical converter through the Ethernet network cable, and then the non-PON physical layer processing unit corresponding to the customer premises equipment is specifically the Ethernet physical layer processing unit.

The non-PON physical layer processing unit converts the downstream PON MAC layer frame to the downstream first user side physical layer frame, which can be specifically as follows. The non-PON physical layer processing unit adds a downstream first user side physical layer frame header to the downstream PON MAC layer frame and obtains the downstream first user side physical layer frame.

The connection between the customer premises equipment and the ONU physical converter through the DSL is taken as an example for description. The DSL physical layer processing unit adds a downstream first DSL physical layer frame header to the downstream first PON MAC layer frame and obtains the downstream first DSL physical layer frame.

The interfaces are configured respectively to connect the lines between the downstream data replicating unit and the non-PON physical layer processing unit, where the lines are configured for the PON physical layer processing unit to send the downstream PON MAC layer frame obtained through conversion by the PON physical layer processing unit to the non-PON physical layer processing unit.

The downstream data replicating unit is configured to replicate the downstream PON MAC layer frame obtained through conversion by the PON physical layer processing unit to all lines which belong to the ONU physical converter.

Further, during the downstream sending process shown in FIG. 17, the PON physical layer processing unit can convert the downstream PON MAC layer frame to an Ethernet frame and send the Ethernet frame to each interface through the downstream data replicating unit. For example, this manner can be used in a scenario where an Ethernet backplane is installed on the ONU physical converter. The following specifically explains functions of each component of the ONU physical converter in this downstream sending manner.

The PON physical layer processing unit is configured to receive the downstream PON physical layer frame sent by the OLT, convert the downstream PON physical layer frame to the downstream PON MAC layer frame, add an Ethernet broadcast frame header to the downstream PON MAC layer frame to obtain the downstream Ethernet frame, and send the downstream Ethernet frame to the downstream data replicating unit.

The downstream data replicating unit is configured to replicate the downstream Ethernet frame obtained through conversion by the PON physical layer processing unit to all lines which belong to the ONU physical converter and send the downstream Ethernet frame to the non-PON physical layer processing unit through each interface.

The non-PON physical layer processing unit is configured to receive the foregoing Ethernet frame, remove the Ethernet broadcast frame header from the Ethernet frame to obtain the downstream PON MAC layer frame, convert the downstream PON MAC layer frame to the downstream first user side physical layer frame, and send the downstream first user side physical layer frame to the customer premises equipment.

The second manner will now be described.

Figure 18:
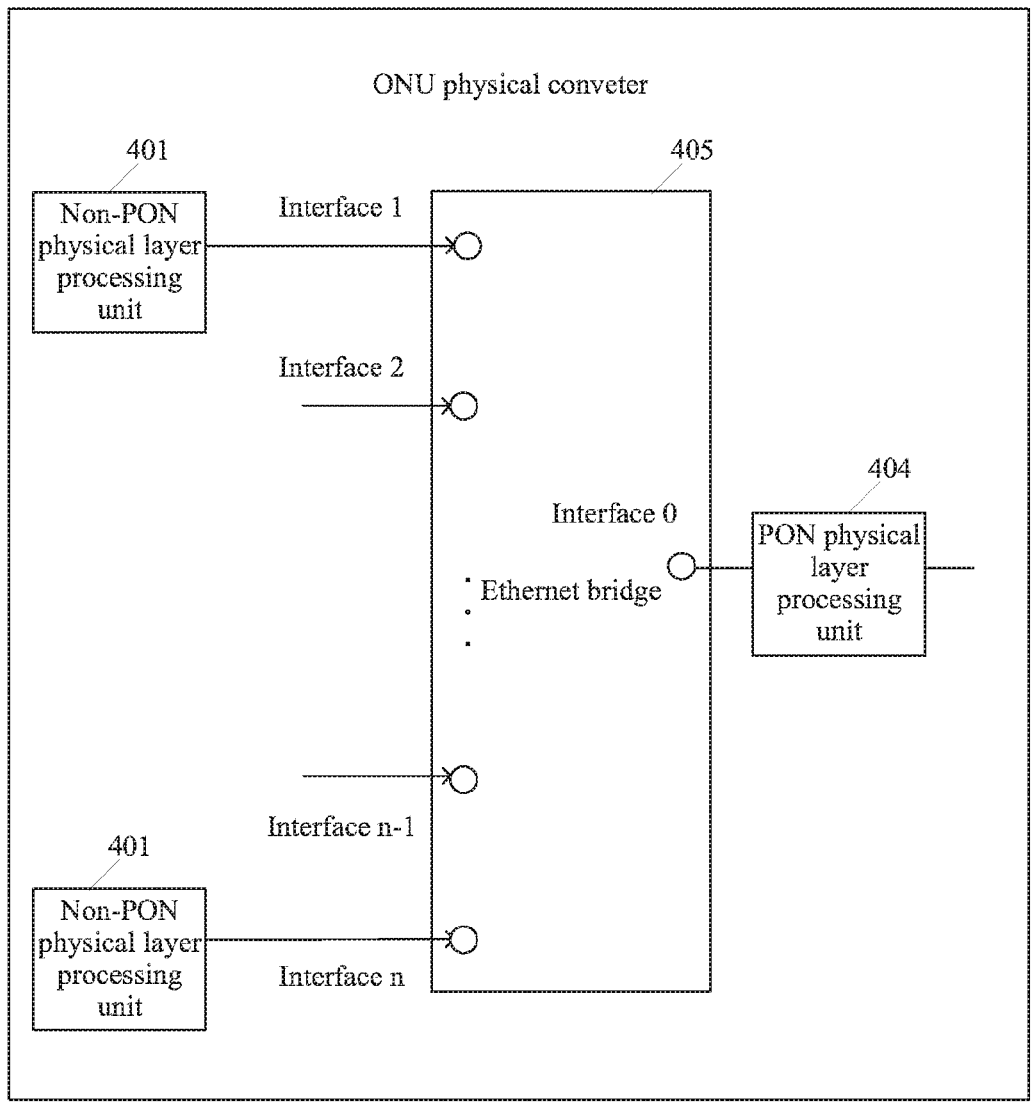
FIG. 18 is a third schematic structural diagram of an ONU physical converter provided by Embodiment 4 of the present invention.

As shown in FIG. 18, the foregoing ONU physical converter includes: a non-PON physical layer processing unit 401, an Ethernet bridge 405, and a PON physical layer processing unit 404. The non-PON physical layer processing unit 401 is configured to receive the upstream first user side physical layer frame which is sent by the customer premises equipment through the non-PON physical signal, convert the upstream first user side physical layer frame to the upstream PON MAC layer frame, and send the upstream PON MAC layer frame to an Ethernet bridge through the input interface corresponding to the non-PON physical layer processing unit 401.

The Ethernet bridge 405, including one output interface 0 and at least one input interface 1-n, is configured to receive the upstream PON MAC layer frame which is sent by the non-PON physical layer processing unit through the input interface 1-n and send the upstream PON MAC layer frame to the PON physical layer processing unit through the output interface 0.

The PON physical layer processing unit 404 is configured to receive the upstream PON MAC layer frame which is sent by the Ethernet bridge 405 through the output interface 0, convert the upstream PON MAC layer frame to the upstream PON physical layer frame, and send the PON physical layer frame to the OLT through the PON physical signal. The PON physical layer processing unit 404 is configured to receive the downstream PON physical layer frame sent by the OLT, convert the downstream PON physical layer frame to the downstream PON MAC layer frame, add the Ethernet broadcast frame header to the downstream PON MAC layer frame to obtain the Ethernet frame, and send the Ethernet frame to the Ethernet bridge 405.

The Ethernet bridge 405, including one input interface 0 and at least one output interface 1-n, is configured to receive the Ethernet frame which is sent by the non-PON physical layer processing unit 401 through the input interface 0 and send the Ethernet frame to the PON physical layer processing unit through the output interface 1-n.

The non-PON physical layer processing unit 401 is specifically configured to receive the Ethernet frame which is sent by the Ethernet bridge 405 through the output interface, remove the Ethernet broadcast frame header from the Ethernet frame to obtain the downstream PON MAC layer frame, convert the downstream PON MAC layer frame to the downstream first user side physical layer frame, and send the downstream first user side physical layer frame to the customer premises equipment through the non-PON physical signal.

The following describes the second manner with an example.

Figure 19:
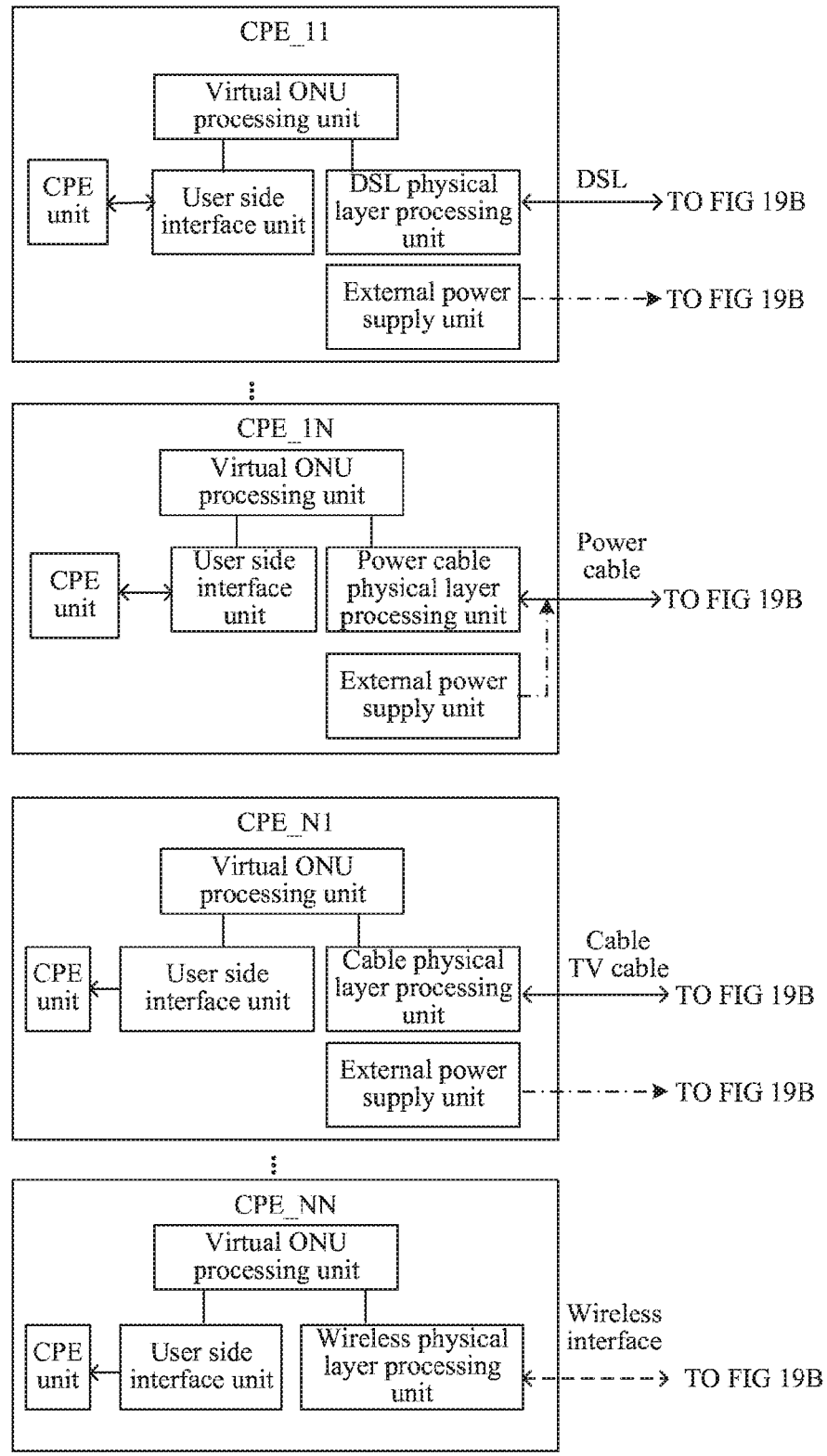
FIGS. 19A-19B is a third schematic construction diagram of an access system for an optical fiber network provided by Embodiment 4 of the present invention.
Figure 19:
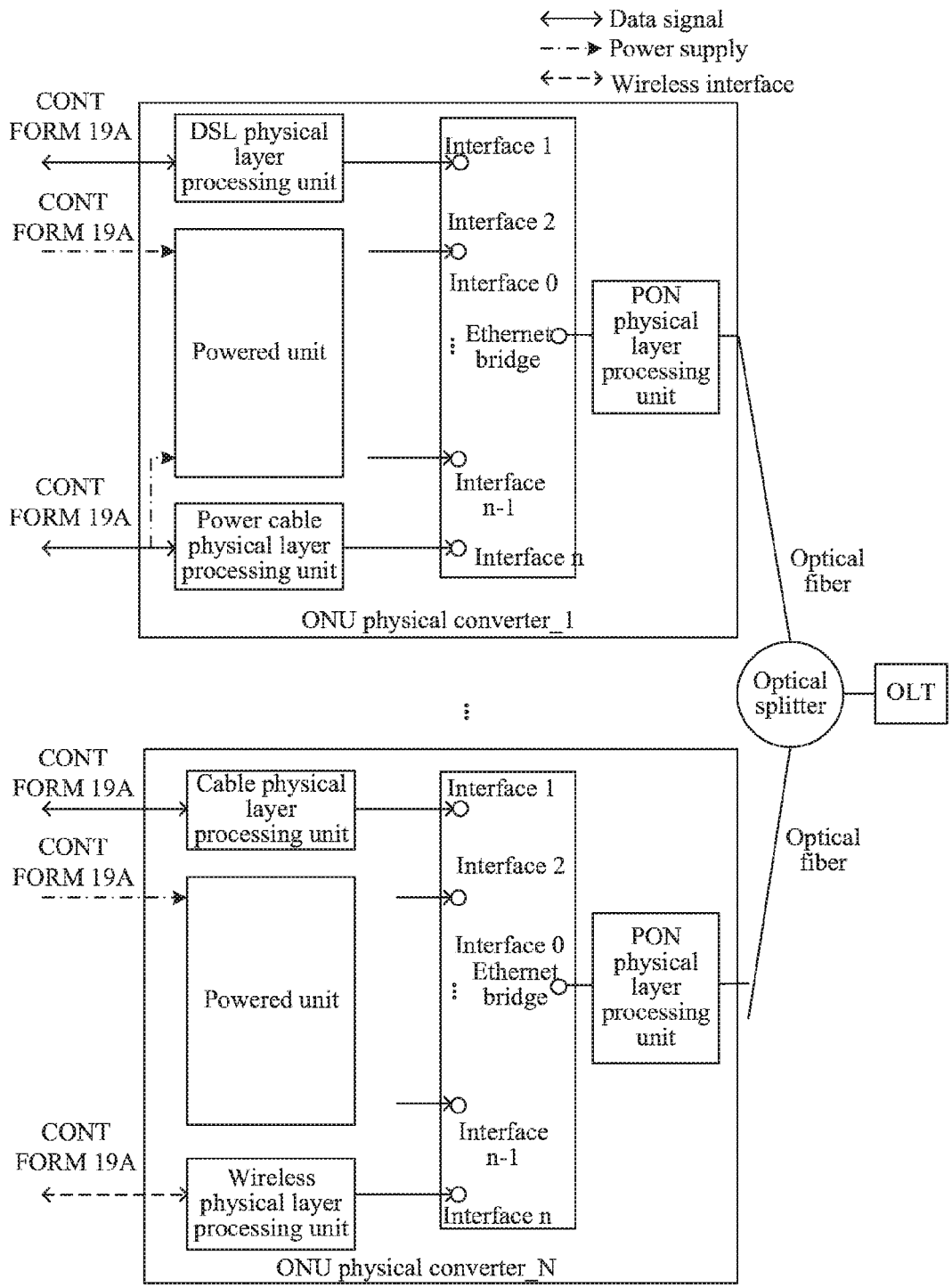

As shown in FIG. 19, this embodiment further provides another access system for the optical fiber network. When the number of interfaces supported by the ONU physical converter exceeds a certain number, the Ethernet bridge is used on the ONU physical converter to support a situation where more interfaces exist (that is, there is a large number of accessed customer premises equipments), which has low costs.

The access system shown in FIG. 19 specifically includes the OLT, a plurality of ONU physical converters connected to the OLT through optical fibers, and a plurality of customer premises equipments connected to the ONU physical converter.

The following provides specific descriptions.

The ONU physical converter specifically includes the non-PON physical layer processing unit, the PON physical layer processing unit, the Ethernet bridge, and the powered unit, where the Ethernet bridge includes one output interface and at least one input interface.

The non-PON physical layer processing unit is configured to receive the upstream first user side physical layer frame which is sent by the customer premises equipment through the non-PON physical signal, convert the upstream first user side physical layer frame to the upstream PON MAC layer frame, and send the upstream PON MAC layer frame to the Ethernet bridge through the input interface corresponding to the non-PON physical layer processing unit. It receives the downstream PON MAC layer frame which is sent by the Ethernet bridge through the output interface, convert the downstream PON MAC layer frame to the first downstream user side physical layer frame, and send the downstream first user side physical layer frame to the customer premises equipment through the non-PON physical signal.

The PON physical layer processing unit is configured to receive the upstream PON MAC layer frame sent by the Ethernet bridge through the output interface, convert the upstream PON MAC layer frame to the upstream PON physical layer frame, send the upstream PON physical layer frame to the OLT through the PON physical signal. It receives the downstream PON physical layer frame which is sent by the OLT through the PON physical signal, convert the downstream PON physical layer frame to the downstream PON MAC layer frame, and send the downstream PON MAC layer frame to the corresponding non-PON physical layer processing unit through the output interface of the Ethernet bridge.

The Ethernet bridge is configured to receive the downstream PON MAC layer frame which is sent by the PON physical layer processing unit through the input interface, send the downstream PON MAC layer frame to the non-PON physical layer processing unit through the output interface, or receive the upstream PON MAC layer frame which is sent by the non-PON physical layer processing unit through the input interface and send the upstream PON MAC layer frame to the PON physical layer processing unit through the output interface.

The foregoing PON MAC layer frame in the downstream PON MAC layer frame or the upstream PON MAC layer frame needs to be an Ethernet frame, which is more applicable to an EPON or a next generation EPON in this case.

The Ethernet bridge is configured to perform forced MAC forwarding (Forced MAC forwarding) in the upstream direction on the PON MAC layer frame from the user side interface, that is to forcibly forward the PON MAC layer frame to the upstream output interface leading to the OLT but not to broadcast the PON MAC layer frame to the user side interface. Optionally, ARP (Address Resolution Protocol) proxy is realized on the Ethernet bridge unit to return a MAC address of the ONU physical adapter to the user side equipment when receiving an ARP request from the user side.

In the downstream direction, the PON MAC layer frame from a PON interface is forwarded according to the MAC address.

Further, as shown in FIG. 19, when data is transmitted in the upstream direction, the interface 1 to the interface n of the Ethernet bridge are input interfaces and the interface 0 is the output interface. When data is transmitted in the downstream direction, the interface 1 to the interface n of the Ethernet bridge are output interfaces, and the interface 0 is the input interface.

The powered unit is configured to obtain electrical energy from the external power supply unit in the customer premises equipment to realize obtaining power from the user side, which can solve the problem of difficulties in long-distance power supply for the ONU for the carrier.

It should be further noted that when the customer premises equipment is connected to the ONU physical converter through the power cable, power can be supplied directly through the power cable.

In this embodiment, connections between the customer premises equipment and the ONU physical converter through the DSL, the power cable, the cable TV cable, the Ethernet cable, and the wireless interface are taken as examples for description. Accordingly, the non-PON physical layer processing unit in this embodiment is specifically the DSL physical layer processing unit, the power cable physical layer processing unit, the cable physical layer processing unit, the Ethernet physical layer processing unit, and the wireless physical layer processing unit.

Accordingly, the foregoing first user side physical layer frame can be respectively the first DSL physical layer frame, the first power cable physical layer frame, the first cable physical layer frame, the first Ethernet physical layer frame, and the first wireless physical layer frame.

For example, as shown FIG. 19, a customer premises equipment_11 is connected to an ONU physical converter_1 through the DSL, and then the non-PON physical layer processing unit corresponding to the customer premises equipment_11 is specifically the DSL physical layer processing unit. A customer premises equipment_1N is connected to the ONU physical converter_1 through the power cable, and then the non-PON physical layer processing unit corresponding to the customer premises equipment_1N is specifically the power cable physical layer processing unit. A customer premises equipment_N1 is connected to an ONU physical converter_N through the cable TV cable, and then the non-PON physical layer processing unit corresponding to the customer premises equipment_N1 is specifically the cable physical layer processing unit. A customer premises equipment_NN is connected to the ONU physical converter_N through the wireless interface, and then the non-PON physical layer processing unit corresponding to the customer premises equipment_NN is specifically the wireless physical layer processing unit.

For FIG. 19, further, the customer premises equipment can also be connected to the ONU physical converter through the Ethernet network cable, and then the non-PON physical layer processing unit corresponding to the customer premises equipment is specifically the Ethernet physical layer processing unit.

Specifically, the non-PON physical layer processing unit converts the upstream first user side physical layer frame to the upstream PON MAC layer frame, which may be the following. The non-PON physical layer processing unit removes the upstream first user side physical layer frame header of the upstream first user side physical layer frame and obtains the upstream PON MAC layer frame.

The connection between the customer premises equipment and the ONU physical converter through the DSL is taken as an example for description. The DSL physical layer processing unit converts the upstream first DSL physical layer frame to the upstream PON MAC layer frame, which is specifically. The DSL physical layer processing unit removes the upstream first DSL physical layer frame header from the upstream first DSL physical layer frame and obtains the upstream PON MAC layer frame.

Specifically, the non-PON physical layer processing unit converts the downstream PON MAC layer frame to the downstream first user side physical layer frame, which may be specifically as follows. The non-PON physical layer processing unit adds a downstream first user side physical layer frame header to the downstream PON MAC layer frame and obtains the downstream first user side physical layer frame.

The connection between the customer premises equipment and the ONU physical converter through the DSL is taken as an example for description. The DSL physical layer processing unit adds a downstream DSL physical layer frame header to the downstream PON MAC layer frame and obtains the downstream DSL physical layer frame.

This embodiment provides the ONU physical converter, where the ONU control plane function, the PON MAC function, and the QoS function on an existing ONU are moved downwards to the customer premises equipment. The ONU physical converter is formed after the forgoing function modules are removed from the existing ONU and only has a function of converting the PON physical layer frame and the first user side physical layer frame. Therefore, a carrier does not need to maintain the ONU control plane function, the PON MAC function, and the QoS function, which lowers maintenance complexity and greatly reduces maintenance costs.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk or the like.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. An access system for an optical fiber network, the access system comprising:

an optical line terminal (OLT);

an optical network unit (ONU) connected to the OLT through an optical fiber; and a customer premises equipment connected to the ONU through a non-optical connection, the customer premises equipment being located on a user side;

wherein the OLT is configured to assign an upstream time slice and a downstream time slice for the customer premises equipment;

wherein the ONU is configured to:

receive a PON (Passive Optical Network) physical layer frame which is sent by the OLT through a PON physical signal, to convert the PON physical layer frame to a first user side physical layer frame corresponding to a non-optical physical signal, and to send the first user side physical layer frame to the customer premises equipment through the non-optical physical signal; or receive a first user side physical layer frame which is sent by the customer premises equipment through the non-optical physical signal, to convert the first user side physical layer frame to a PON physical layer frame corresponding to a PON physical signal, and send the PON physical layer frame to the OLT through the PON physical signal; and wherein the customer premises equipment comprises:

a user side interface, configured to receive an upstream second user side physical layer frame sent by a user, or send a downstream second user side physical layer frame to the user;

a virtual ONU processor, configured to realize an ONU control plane function and a PON MAC function, to encapsulate the upstream second user side physical layer frame into an upstream PON MAC layer frame, to send the upstream PON MAC layer frame to the ONU through a user side physical layer processor according to the upstream time slice assigned by the OLT or receive, according to the downstream time slice assigned by the OLT, a downstream PON MAC layer frame sent by the user side physical layer processor, to convert the downstream PON MAC layer frame to the downstream second user side physical layer frame, and to send the downstream second user side physical layer frame to the user side physical layer processor through the user side interface; and the user side physical layer processor, configured to convert the upstream PON MAC layer frame sent by the virtual ONU processor to an upstream first user side physical layer frame corresponding to a non-optical physical signal and to send the upstream first user side physical layer frame to the ONU through the non-optical physical signal, or to receive a downstream first user side physical layer frame sent by the ONU, to convert the downstream first user side physical layer frame to the downstream PON MAC layer frame, and to send the downstream PON MAC layer frame to the virtual ONU processor.

2. A method using the system according to claim 1, the method comprising:
   reporting, by the customer premises equipment, a data queue state to the OLT through the ONU;
   assigning, by the OLT, an upstream time slice and a downstream time slice to the customer premises equipment;
   sending configuration information which comprises the upstream time slice and the downstream time slice to the customer premises equipment through the ONU; and
   sending, by the customer premises equipment, according to the configuration information, upstream data to the OLT through the ONU or receiving downstream data from the OLT.

3. The method according to claim 2, wherein before the customer premises equipment reports the data queue state to an OLT through an ONU, the method further comprises:
   receiving, by the customer premises equipment, a second physical layer parameter which is delivered by the OLT through the ONU; and
   establishing, by the customer premises equipment, a new communication connection with the ONU according to the second physical layer parameter delivered by the OLT.

4. The method according to claim 3, wherein before the customer premises equipment receives the second physical layer parameter, the method further comprises:
   establishing, by the customer premises equipment, a communication connection with the ONU according to a default first physical layer parameter; and
   establishing, by the customer premises equipment, a communication connection with the OLT, wherein the default first physical layer parameter is reserved on the customer premises equipment and the ONU.

5. The method according to claim 3, wherein after the customer premises equipment sends the upstream data to the OLT through the ONU or receives downstream data from the OLT, the method further comprises:
   receiving, by the OLT, a request to increase bandwidth for temporary communication of a user, reassigning bandwidth to the customer premises equipment;
   delivering, by the OLT, a third physical layer parameter to the customer premises equipment through the ONU according to current bandwidth assignment;
   establishing, by the customer premises equipment, a new communication connection with the ONU according to the third physical layer parameter;
   obtaining, by the customer premises equipment, the reassigned bandwidth;
   delivering, by the OLT, the second physical layer parameter to the customer premises equipment through the ONU when the temporary communication ends;
   re-establishing, by the customer premises equipment, a communication connection with the ONU according to the second physical layer parameter; and
   re-establishing, by the customer premises equipment, a communication connection with the ONU, so that the customer premises equipment restores the bandwidth before the temporary communication.

6. A customer premises equipment, wherein the customer premises equipment is connected to an optical network unit (ONU) through a non-optical connection and is located on a user side, and wherein the customer premises equipment is configured to realize an ONU control plane function and a passive optical network (PON) media access control (MAC) function, to send a first user side physical layer frame to an optical line terminal (OLT) through the ONU according to an upstream time slice assigned by the OLT or to receive a first user side physical layer frame which is sent by the OLT through the ONU according to a downstream time slice assigned by the OLT, and wherein the customer premises equipment comprises:
   a user side interface unit, configured to receive an upstream second user side physical layer frame sent by a user or send a downstream second user side physical layer frame to the user;
   a virtual ONU processor, configured to realize the ONU control plane function and the PON MAC function, to encapsulate the upstream second user side physical layer frame into an upstream PON MAC layer frame, to send the upstream PON MAC layer frame to the ONU through a user side physical layer processor according to the upstream time slice assigned by the OLT or receive, according to the downstream time slice assigned by the OLT, a downstream PON MAC layer frame sent by the user side physical layer processor, to convert the downstream PON MAC layer frame to the downstream second user side physical layer frame, and to send the downstream second user side physical layer frame to the user side physical layer processor through the user side interface unit; and
   the user side physical layer processor, which is configured to convert the upstream PON MAC layer frame sent by the virtual ONU processor to an upstream first user side physical layer frame corresponding to a non-optical physical signal and to send the upstream first user side physical layer frame to the ONU through the non-optical physical signal, or to receive a downstream first user side physical layer frame sent by the ONU, to convert the downstream first user side physical layer frame to the downstream PON MAC layer frame, and to send the downstream PON MAC layer frame to the virtual ONU processor.

7. The customer premises equipment according to claim 6, wherein the customer premises equipment is further configured to receive a second physical layer parameter which is delivered by the OLT through the ONU and to establish a new communication connection with the ONU according to the second physical layer parameter delivered by the OLT.

8. The customer premises equipment according to claim 7, wherein the customer premises equipment is further configured to, before receiving the second physical layer parameter which is delivered by the OLT through the ONU, establish a communication connection with the ONU according to a default first physical layer parameter and establish a communication connection with the OLT, wherein the default first physical layer parameter is reserved on the customer premises equipment.

9. An optical network unit (ONU), wherein the ONU is connected to an optical line terminal (OLT) through an optical fiber, and is configured to:
   receive a signal according to one or both of the following:
      receive a passive optical network (PON) physical layer frame which is sent by the OLT through a PON physical signal, to convert the PON physical layer frame to a first user side physical layer frame corresponding to a non-optical physical signal, and to send the first user side physical layer frame to a customer premises equipment through the non-optical physical signal; and receive a first user side physical layer frame which is sent by the customer premises equipment through the non-optical physical signal, to convert the first user side physical layer frame to a PON physical layer frame corresponding to the PON physical signal, and to send the PON physical layer frame to the OLT through the PON physical signal;

forward to the customer premises equipment a second physical layer parameter delivered by the OLT and to establish a new communication connection with the customer premises equipment according to the second physical layer parameter delivered by the OLT; and establish a communication connection with the customer premises equipment according to a default first physical layer parameter before the customer premises equipment receives the second physical layer parameter which is delivered by the OLT through the ONU, wherein the default first physical layer parameter is reserved on the customer premises equipment.

10. The ONU according to claim 9, wherein the ONU comprises:
a non-optical physical layer processor;
a switch controller;
a switch; and
a PON physical layer processor;
wherein the non-optical physical layer processor is configured to receive an upstream first user side physical layer frame which is sent by the customer premises equipment through the non-optical physical signal and to convert the upstream first user side physical layer frame to an upstream PON media access control (MAC) layer frame;
wherein the switch controller is configured to, when receiving the upstream PON MAC layer frame sent by the customer premises equipment, generate a switch control signal corresponding to the customer premises equipment and to send the switch control signal corresponding to the customer premises equipment to the switch;
wherein the switch comprises one output interface and at least one input interface, wherein there is one-to-one correspondence between the input interface and the customer premises equipment connected to the ONU, and wherein the switch is configured to connect, according to the switch control signal corresponding to the customer premises equipment, a channel between an input interface corresponding to the customer premises equipment and an output interface, wherein the channel is configured for the non-optical physical layer processor to send the upstream PON MAC layer frame obtained through conversion by the non-optical physical layer processor to the PON physical layer processor; and
wherein the PON physical layer processor is configured to convert the upstream PON MAC layer frame to an upstream PON physical layer frame and to send the upstream PON physical layer frame to the OLT through the PON physical signal.

11. The ONU according to claim 9, wherein the ONU comprises:
a non-optical physical layer processor;
an Ethernet bridge; and
a PON physical layer processor;
wherein the non-optical physical layer processor is configured to receive an upstream first user side physical layer frame which is sent by the customer premises equipment through the non-optical physical signal, to convert the upstream first user side physical layer frame to an upstream PON MAC layer frame, and to send the upstream PON MAC layer frame to the Ethernet bridge through an input interface corresponding to the non-optical physical layer processor;
wherein the Ethernet bridge comprises one output interface and at least one input interface and wherein the Ethernet bridge is configured to receive the upstream PON MAC layer frame which is sent by the non-optical physical layer processor through the input interface, to send the upstream PON MAC layer frame to the PON physical layer processor through the output interface; and to return an MAC address of an ONU physical adapter to the customer premises equipment when the Ethernet bridge receives an ARP (Address Resolution Protocol) request from a user side; and
wherein the PON physical layer processor is configured to receive the upstream PON MAC layer frame which is sent by the Ethernet bridge through the output interface, to convert the upstream PON MAC layer frame to the PON physical layer frame, and to send the PON physical layer frame to the OLT through the PON physical signal.

12. The ONU according to claim 9, wherein the ONU comprises:
a PON physical layer processor:
a non-optical physical layer processor;
interfaces respectively corresponding to customer premises equipment connected to the ONU; and
a downstream data replicating unit,
wherein the PON physical layer processor is configured to receive a downstream PON physical layer frame which is sent by the OLT through the PON physical signal and to convert the downstream PON physical layer frame to a downstream PON MAC layer frame;
wherein the interfaces are configured respectively to connect lines between the downstream data replicating unit and the non-optical physical layer processor, wherein the lines are configured to send the downstream PON MAC layer frame obtained through conversion by the PON physical layer processor to the non-optical physical layer processor;
wherein the downstream data replicating unit is configured to replicate the downstream PON MAC layer frame obtained through conversion by the PON physical layer processor to all lines which belong to the ONU; and
wherein the non-optical physical layer processor is configured to convert the downstream PON MAC layer frame to a downstream first user side physical layer frame and to send the downstream first user side physical layer frame to the customer premises equipment through the non-optical physical signal.

* * * * *